US011777577B2

(12) United States Patent
Yang et al.

(10) Patent No.: US 11,777,577 B2
(45) Date of Patent: Oct. 3, 2023

(54) CHANNEL STATE REPORTING FOR SIDELINK COMMUNICATIONS

(71) Applicant: QUALCOMM incorporated, San Diego, CA (US)

(72) Inventors: Wei Yang, San Diego, CA (US); Seyedkianoush Hosseini, San Diego, CA (US); Gokul Sridharan, Sunnyvale, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 46 days.

(21) Appl. No.: 17/326,747

(22) Filed: May 21, 2021

(65) Prior Publication Data

US 2022/0376756 A1 Nov. 24, 2022

(51) Int. Cl.
*H04W 72/10* (2009.01)
*H04B 7/06* (2006.01)
*H04L 1/00* (2006.01)
*H04L 5/00* (2006.01)
(Continued)

(52) U.S. Cl.
CPC ........ *H04B 7/0626* (2013.01); *H04L 1/0026* (2013.01); *H04L 5/0048* (2013.01); *H04W 24/10* (2013.01); *H04W 72/20* (2023.01)

(58) Field of Classification Search
CPC ... H04B 7/0626; H04L 1/0026; H04L 5/0048; H04W 24/10; H04W 72/0406
See application file for complete search history.

(56) References Cited

U.S. PATENT DOCUMENTS

| 11,317,381 | B2 * | 4/2022 | Li ........................ H04W 72/02 |
| 2014/0023008 | A1 * | 1/2014 | Ahn ...................... H04L 5/0053 |
| | | | 370/329 |

(Continued)

FOREIGN PATENT DOCUMENTS

| CA | 3114479 A1 | 4/2020 |
| EP | 3484057 A1 | 5/2019 |

OTHER PUBLICATIONS

International Search Report and Written Opinion—PCT/US2022/029244—ISA/EPO—dated Sep. 27, 2022.

*Primary Examiner* — Fahmida S Chowdhury
(74) *Attorney, Agent, or Firm* — Holland & Hart LLP

(57) ABSTRACT

Methods, systems, and devices for wireless communications are described. A first device (e.g., a user equipment (UE)) may receive signaling indicating a set of channel state information (CSI) report configurations for sidelink communications between the first device and a second device. The first device may then receive a request from the second device for a CSI report according to a first CSI report configuration from the set of CSI report configurations. The first device may perform channel measurements based on receiving the request and may generate the CSI report using the channel measurements according to the first CSI configuration. In some cases, the first device may determine whether to additionally generate the CSI report using one or more previous channel measurements based on whether the previous channel measurements were taken according to the same CSI report. The first device may then transmit the generated CSI report to the second device.

26 Claims, 13 Drawing Sheets

(51) Int. Cl.
*H04W 24/10* (2009.01)
*H04W 72/20* (2023.01)

(56) References Cited

U.S. PATENT DOCUMENTS

| | | | | |
|---|---|---|---|---|
| 2015/0043475 | A1* | 2/2015 | Kim | H04W 72/23 |
| | | | | 370/329 |
| 2017/0126299 | A1* | 5/2017 | Wei | H04L 5/001 |
| 2019/0207737 | A1* | 7/2019 | Babaei | H04L 5/0098 |
| 2020/0337096 | A1* | 10/2020 | Zhang | H04L 1/0061 |
| 2021/0028842 | A1* | 1/2021 | Kim | H04B 7/0628 |
| 2021/0028843 | A1* | 1/2021 | Zhou | H04B 7/063 |
| 2021/0050888 | A1 | 2/2021 | Manolakos et al. | |
| 2021/0051653 | A1* | 2/2021 | Park | H04W 8/22 |
| 2021/0105055 | A1* | 4/2021 | Chae | H04L 5/0026 |
| 2021/0194557 | A1* | 6/2021 | Wang | H04L 5/0055 |
| 2021/0360631 | A1* | 11/2021 | Cirik | H04L 1/0073 |
| 2021/0385842 | A1 | 12/2021 | Zhao et al. | |
| 2022/0014338 | A1* | 1/2022 | Yoshioka | H04W 8/005 |
| 2022/0053477 | A1* | 2/2022 | Yao | H04B 7/0628 |
| 2022/0201528 | A1* | 6/2022 | Shin | H04W 24/10 |
| 2022/0217738 | A1* | 7/2022 | Lee | H04W 72/54 |
| 2022/0394722 | A1* | 12/2022 | Hwang | H04W 72/542 |
| 2023/0093335 | A1* | 3/2023 | Harrison | H04L 1/00 |

* cited by examiner

CHANNEL STATE REPORTING FOR SIDELINK COMMUNICATIONS

FIELD OF TECHNOLOGY

The following relates to wireless communications, including channel state reporting for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may generate a channel state information (CSI) report based on a first set of channel quality measurements and a second set of channel quality measurements. More specifically, the UE may filter (e.g., average) the first and second sets of channel quality measurements and may include the filtered channel quality measurements in the CSI report.

SUMMARY

The described techniques relate to improved methods, systems, devices, and apparatuses that support channel state reporting for sidelink communications. Generally, the described techniques provide for a user equipment (UE) to transmit a channel state information (CSI) report for sidelink communications according to one of a set of possible CSI report configurations. For example, a first UE may receive (e.g., from a second UE, from a base station) signaling indicating the set of possible CSI report configurations. Then, the first UE may receive, from the second UE, a request for a CSI report according to a first CSI report configuration (e.g., from the set of CSI report configurations). The first UE may measure one or more CSI-reference signals (CSI-RSs) from the second UE and may determine a first set of channel quality measurements based on measuring the one or more CSI-RSs. In some cases, the first UE may determine whether to filter (e.g., average) the first set of channel quality measurements with a second set of channel quality measurements from previously generated CSI reports based on whether the previously generated CSI reports are generated according to the same CSI report configuration. For example, the first UE may filter the first and second sets of channel quality measurements if both sets of channel quality measurements are generated according to a same CSI report configuration. Additionally, the first UE may refrain from filtering the first and second sets of channel quality measurements if the first and second sets of channel quality measurements are generated according to different CSI report configuration. Generating sidelink CSI reports according to one of multiple possible sets of CSI report configurations may enable the first UE to generate the CSI report with improved accuracy and greater efficiency, among other benefits.

A method for wireless communication at a first device is described. The method may include receiving signaling indicating a set of multiple CSI report configurations for sidelink communications between the first device and a second device, receiving, from the second device and based on receiving the signaling, a request for a CSI report according to a first CSI report configuration from the set of multiple CSI report configurations, and transmitting, to the second device and based on receiving the request, the CSI report according to the first CSI report configuration.

An apparatus for wireless communication at a first device is described. The apparatus may include a processor, memory coupled with the processor, and instructions stored in the memory. The instructions may be executable by the processor to cause the apparatus to receive signaling indicating a set of multiple CSI report configurations for sidelink communications between the first device and a second device, receive, from the second device and based on receiving the signaling, a request for a CSI report according to a first CSI report configuration from the set of multiple CSI report configurations, and transmit, to the second device and based on receiving the request, the CSI report according to the first CSI report configuration.

Another apparatus for wireless communication at a first device is described. The apparatus may include means for receiving signaling indicating a set of multiple CSI report configurations for sidelink communications between the first device and a second device, means for receiving, from the second device and based on receiving the signaling, a request for a CSI report according to a first CSI report configuration from the set of multiple CSI report configurations, and means for transmitting, to the second device and based on receiving the request, the CSI report according to the first CSI report configuration.

A non-transitory computer-readable medium storing code for wireless communication at a first device is described. The code may include instructions executable by a processor to receive signaling indicating a set of multiple CSI report configurations for sidelink communications between the first device and a second device, receive, from the second device and based on receiving the signaling, a request for a CSI report according to a first CSI report configuration from the set of multiple CSI report configurations, and transmit, to the second device and based on receiving the request, the CSI report according to the first CSI report configuration.

In some examples of the method, apparatuses, and non-transitory computer-readable medium described herein, receiving the request for the CSI report may include operations, features, means, or instructions for receiving, from the second device, sidelink control information (SCI) including one or more fields that indicate the first CSI report configuration.

Some examples of the method, apparatuses, and non-transitory computer-readable medium described herein may further include operations, features, means, or instructions for identifying, based on receiving the request and according to the first CSI report configuration, a first channel quality measurement associated with the sidelink communications between the first device and the second device, and generating the CSI report using the channel quality measurement identified according to the first CSI report configuration.

Some examples of the method, apparatuses, and non-transitory computer-readable medium described herein may further include operations, features, means, or instructions for receiving, from the second device prior to receiving the request for the CSI report according to the first CSI report configuration, a second request for a second CSI report according to a second CSI report configuration from the set of multiple CSI report configurations, identifying, based on receiving the second request and according to the second CSI report configuration, a second channel quality measurement associated with the sidelink communications between the first device and the second device, and determining whether to generate the CSI report using the second channel quality measurement identified according to the second CSI report configuration based on whether the second CSI report configuration is different from the first CSI report configuration, where transmitting the CSI report according to the first CSI report configuration may be based on the determining.

Some examples of the method, apparatuses, and non-transitory computer-readable medium described herein may further include operations, features, means, or instructions for generating the CSI report using the first channel quality measurement identified according to the first CSI report configuration and the second channel quality measurement identified according to the second CSI report configuration based on the second CSI report configuration being the same as the first CSI report configuration.

Some examples of the method, apparatuses, and non-transitory computer-readable medium described herein may further include operations, features, means, or instructions for receiving, from the second device based on receiving the request for the CSI report according to the first CSI report configuration and prior to transmitting the CSI report, a second request for a second CSI report according to a second CSI report configuration from the set of multiple CSI report configurations, where the second CSI report configuration may be different from the first CSI report configuration, and transmitting, to the second device based on receiving the second request, the second CSI report according to the second CSI report configuration.

In some examples of the method, apparatuses, and non-transitory computer-readable medium described herein, transmitting the CSI report and transmitting the second CSI report may include operations, features, means, or instructions for transmitting a physical sidelink shared channel (PSSCH) transmission including a first media access control (MAC)-control element (MAC-CE) and a second MAC-CE, where the first MAC-CE includes the CSI report and a first indication of the first CSI report configuration and the second MAC-CE includes the second CSI report and a second indication of the second CSI report configuration.

In some examples of the method, apparatuses, and non-transitory computer-readable medium described herein, the first CSI report configuration may be associated with a first component carrier (CC), the second CSI report configuration may be associated with a second CC, the first MAC-CE may include an indication of a first cell index associated with the CSI report, and the second MAC-CE may include an indication of a second cell index associated with the second CSI report.

In some examples of the method, apparatuses, and non-transitory computer-readable medium described herein, transmitting the CSI report and transmitting the second CSI report may include operations, features, means, or instructions for transmitting a PSSCH transmission including a MAC-CE, where the MAC-CE includes the CSI report and the second CSI report.

In some examples of the method, apparatuses, and non-transitory computer-readable medium described herein, transmitting the CSI report may include operations, features, means, or instructions for transmitting the CSI report including an indication of the first CSI report configuration.

In some examples of the method, apparatuses, and non-transitory computer-readable medium described herein, the signaling indicating the set of multiple CSI report configurations may indicate a respective transmission configuration indicator (TCI) state, from a set of multiple TCI states associated with the first device for the sidelink communications between the first device and the second device, corresponding to each of the set of multiple CSI report configurations, the request for the CSI report including an indication of a first TCI state from the set of multiple TCI states corresponding to the first CSI report configuration, and transmitting the CSI report according to the first CSI report configuration based on the request for the CSI report including the indication of the first TCI state.

Some examples of the method, apparatuses, and non-transitory computer-readable medium described herein may further include operations, features, means, or instructions for receiving, from the second device, a CSI-RS based on the request for the CSI report and the first CSI report configuration, where transmitting the CSI report may be based on receiving the CSI-RS.

A method for wireless communication at a first device is described. The method may include transmitting, to a second device, signaling indicating a set of multiple CSI report configurations for sidelink communications between the first device and the second device, transmitting, to the second device and based on transmitting the signaling, a request for a CSI report according to a first CSI report configuration from the set of multiple CSI report configurations, and receiving, from the second device and based on transmitting the request, the CSI report according to the first CSI report configuration.

An apparatus for wireless communication at a first device is described. The apparatus may include a processor, memory coupled with the processor, and instructions stored in the memory. The instructions may be executable by the processor to cause the apparatus to transmit, to a second device, signaling indicating a set of multiple CSI report configurations for sidelink communications between the first device and the second device, transmit, to the second device and based on transmitting the signaling, a request for a CSI report according to a first CSI report configuration from the set of multiple CSI report configurations, and receive, from the second device and based on transmitting the request, the CSI report according to the first CSI report configuration.

Another apparatus for wireless communication at a first device is described. The apparatus may include means for transmitting, to a second device, signaling indicating a set of multiple CSI report configurations for sidelink communications between the first device and the second device, means for transmitting, to the second device and based on transmitting the signaling, a request for a CSI report according to a first CSI report configuration from the set of multiple CSI report configurations, and means for receiving, from the second device and based on transmitting the request, the CSI report according to the first CSI report configuration.

A non-transitory computer-readable medium storing code for wireless communication at a first device is described. The code may include instructions executable by a processor to transmit, to a second device, signaling indicating a set of multiple CSI report configurations for sidelink communications between the first device and the second device, transmit, to the second device and based on transmitting the signaling, a request for a CSI report according to a first CSI report configuration from the set of multiple CSI report configurations, and receive, from the second device and based on transmitting the request, the CSI report according to the first CSI report configuration.

In some examples of the method, apparatuses, and non-transitory computer-readable medium described herein, transmitting the request for the CSI report may include operations, features, means, or instructions for transmitting, to the second device, SCI including one or more bits that indicate the first CSI report configuration.

Some examples of the method, apparatuses, and non-transitory computer-readable medium described herein may further include operations, features, means, or instructions for transmitting, to the second device based on transmitting the request for the CSI report according to the first CSI report configuration and prior to receiving the CSI report, a second request for a second CSI report according to a second CSI report configuration from the set of multiple CSI report configurations, where the second CSI report configuration may be different from the first CSI report configuration, and receiving, from the second device and based on transmitting the second request, the second CSI report according to the second CSI report configuration.

In some examples of the method, apparatuses, and non-transitory computer-readable medium described herein, receiving the CSI report and receiving the second CSI report may include operations, features, means, or instructions for receiving a PSSCH transmission including a first MAC-CE and a second MAC-CE, where the first MAC-CE includes the CSI report and a first indication of the first CSI report configuration, and where the second MAC-CE includes the second CSI report and a second indication of the second CSI report configuration.

In some examples of the method, apparatuses, and non-transitory computer-readable medium described herein, receiving the CSI report may include operations, features, means, or instructions for receiving the CSI report including an indication of the first CSI report configuration.

In some examples of the method, apparatuses, and non-transitory computer-readable medium described herein, the signaling indicating the set of multiple CSI report configurations may indicate a respective TCI state from a set of multiple TCI states associated with the first device for the sidelink communications between the first device and the second device, the respective TCI state corresponding to each of the set of multiple CSI report configurations, the request for the CSI report including an indication of a first TCI state from the set of multiple TCI states corresponding to the first CSI report configuration, and receiving the CSI report according to the first CSI report configuration may be based on the request for the CSI report including the indication of the first TCI state.

Some examples of the method, apparatuses, and non-transitory computer-readable medium described herein may further include operations, features, means, or instructions for identifying that a scheduled transmission associated with a first transmission power and the request for the CSI report at least partially overlap in time, identifying a scaled transmission power for transmitting the request for the CSI report to the second device based on the scheduled transmission and the request for the CSI report at least partially overlapping in time, and determining whether to transmit the request for the CSI report based on whether a sum of the first transmission power and the scaled transmission power exceeds a threshold transmit power, where transmitting the request for the CSI report may be based on the sum being less than the threshold transmit power.

Some examples of the method, apparatuses, and non-transitory computer-readable medium described herein may further include operations, features, means, or instructions for selecting, from the set of multiple CSI report configurations, the first CSI report configuration for the CSI report based on a transmission power level of a CSI-reference signal (CSI-RS), where transmitting the request for the CSI report may be based on the selecting and transmitting, to the second device, the CSI reference signal according to the transmission power level, where receiving the CSI report may be based on transmitting the CSI-RS.

DETAILED DESCRIPTION

Figure 1:
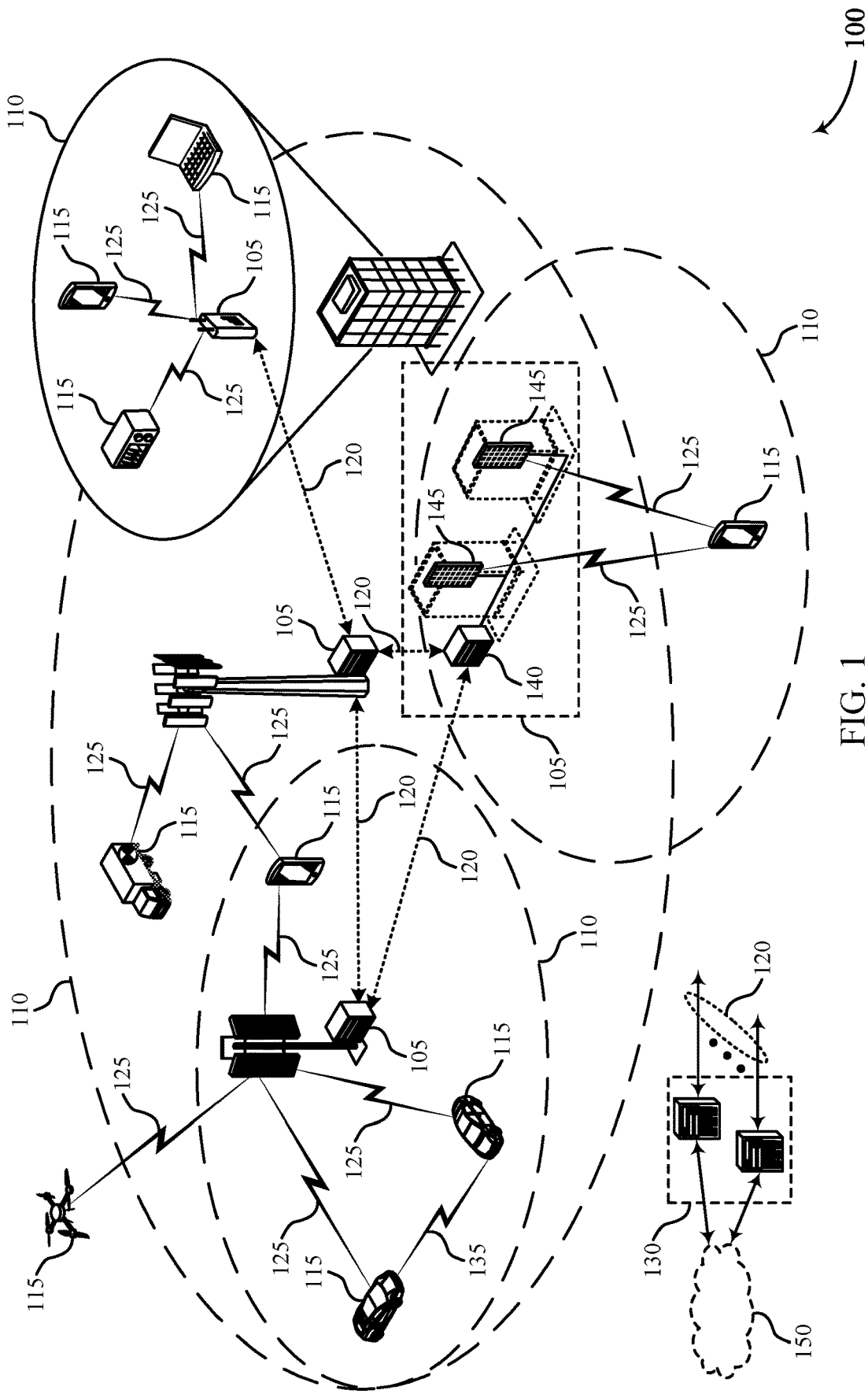
FIGS. 1-3 illustrate examples of wireless communications systems that support channel state reporting for sidelink communications in accordance with aspects of the present disclosure.

In some wireless communications systems, a first user equipment (UE) may communicate with a second UE over a sidelink channel. In some cases, the second UE may receive a request for a channel state information (CSI) report from the first UE. The second UE may generate the requested CSI report based on measuring a first set of CSI reference signals (CSI-RSs) from the first UE and using the measured CSI-RSs to determine a first set of channel quality measurements associated with the sidelink channel. In some cases, the second UE may filter (e.g., average) the first set of channel quality measurements with a second set of channel quality measurements from previously generated CSI reports. The second UE may include the filtered channel quality measurements in the requested CSI report.

In some cases, however, the first UE may use different transmit parameters (e.g., transmit powers, transmit beams, transmit antennas) when transmitting CSI-RSs for different CSI reports. For example, a transmit power of the first set of CSI-RSs (e.g., from which the first set of channel quality measurements was determined) may be different from a transmit power of a second set of CSI-RSs (e.g., from which the second set of channel quality measurements was determined). Thus, filtering the first and second sets of channel quality measurements may decrease the accuracy of the requested CSI report.

In accordance with aspects of the present disclosure, the second UE may receive multiple CSI report configurations (e.g., from the first UE, from a base station). The second UE may then receive, from the first UE, a request for a CSI report associated with one of the multiple CSI report configurations. Accordingly, the first UE may transmit CSI-RSs to the second UE using transmit parameters that correspond to the CSI report configuration. The second UE may determine a first set of channel quality measurements based on measuring the CSI-RSs from the first UE. In some cases, the second UE may selectively filter the first set of channel quality measurements with a second set of channel quality measurements from previous CSI reports in cases that the previous CSI reports are generated according to the same CSI report configuration. In some examples, the second UE may include the filtered channel quality measurements in the CSI report and transmit the CSI report to the first UE in accordance with the CSI report configuration.

Aspects of the present disclosure may be implemented to realize one or more of the following advantages. The described techniques may provide for improved sidelink CSI reporting procedures, among other benefits. For example, a first UE may transmit an indication of a CSI report configuration to a second UE and the second UE may use the indicated CSI report configuration to generate a CSI report with relatively higher accuracy. More specifically, the second UE may generate channel quality measurements with relatively higher accuracy based on using the indicated CSI report configuration to filter the channel quality measurements with other channel quality measurements associated with the same CSI report configuration. As such, the first and second UEs may use the filtered channel quality measurements to estimate sidelink channel conditions with relatively greater precision.

Aspects of the disclosure are initially described in the context of wireless communications systems, a transmission schedule, and a process flow. Aspects of the disclosure are further illustrated by and described with reference to apparatus diagrams, system diagrams, and flowcharts that relate to channel state reporting for sidelink communications.

FIG. 1 illustrates an example of a wireless communications system 100 that supports channel state reporting for sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers (CCs) and one or more uplink CCs according to a carrier aggregation configuration. Carrier aggregation may be used with both frequency division duplexing (FDD) and time division duplexing (TDD) CCs.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with CCs operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples of the wireless communications system 100 (e.g., in cases that the wireless communications system 200 is a V2X system), the UEs 115 may rely on sidelink CSI reporting (e.g., rather than relaying the CSI report 215 to a base station). That is, in cases that the UEs 115 are highly mobile, sidelinks between the UEs 115 may be subject to large channel variations. Here, sidelink CSI reporting may result in higher reliability when compared to relaying CSI reports between UEs 115 via a base station 105. That is, sidelink communications between the UE 115 may be interference-limited for some operating modes (e.g., operating mode 2) and interference may be difficult to predict and report. Thus, wireless communications system 100 may support aperiodic CSI reporting (e.g., one-shot CSI feedback) between the UEs 115 via sidelink CSI reporting. In some other cases, the UEs 115 may use periodic or semi-persistent CSI-RSs and CSI reports to improve unicast link performance.

In some cases, UEs 115 (which may examples of wearables, cell phones, etc.) may be static (e.g., may not change locations) for a relatively long period of time. In such cases, a UE 115 may filter a CSI report with other CSI reports that are triggered by the same sidelink transmitter (e.g., the same UE 115) instead of reporting a one-shot CSI report each time the UE 115 receives a request for a CSI report. That is, a UE may average channel quality measurements associated with other CSI reports and transmit a CSI report indicating an averaged (e.g., filtered) channel quality measurement (e.g., rather than the single channel quality measurement).

In some cases, however, a UE 115 may change transmission parameters when transmitting reference signals to another UE 115 to generate a CSI report. If a UE 115 transmits filtered CSI reports when the UE 115 changes transmission parameters for the reference signals, the filtered CSI reports may include less reliable channel quality measurements (e.g., channel quality measurements averaged between reference signals transmitted with different parameters).

For instance, a first UE may adjust a transmission power of a reference signal transmission. For example, a first UE 115 may perform a dynamic power control operation based on downlink and sidelink pathloss in a resource allocation (e.g., a mode 1 resource allocation) and adjust a transmission power for a CSI-RS transmission accordingly. For example, if an uplink transmission is scheduled to be transmitted (e.g., from another UE 115 to a base station 105 in the same geographic coverage area 110) on resources that the first UE 115 intends to use for transmitting the CSI-RS, the first UE 115 may reduce a transmission power of the CSI-RS based on a downlink pathloss measurement or an indication from the base station 105. Alternatively, a transmit power of the CSI-RS may be determined (e.g., controlled) by a sidelink power of the first UE 115 if there are no co-scheduled uplink transmissions that overlap with the CSI-RS (e.g., as described with reference to FIG. 3).

In cases that the first UE 115 adjusts a transmission power for CSI-RSs, a second UE configured to generate a CSI report based on receiving the CSI-RSs may continue to average CSI reports. For example, the second UE 115 may generate a CSI report including channel quality measurements averaged across CSI-RSs transmitted using different transmission powers. Here, the CSI report may include channel measurement information that does not accurately reflect the current channel state.

In some other instances, the first UE 115 may change transmission parameters for reference signal transmissions by dynamically or semi-statically changing transmit antennas (e.g., based on measurement information to improve performance of the first UE 115). As an example, a transmit antenna change at the first UE 115 may be triggered by uplink events in an uplink bandwidth part (BWP). Additionally or alternatively, the first UE 115 may change transmit beams (e.g., while operating in Frequency Range 2 (FR2)). In such cases, the second UE 115 may be unable to determine that transmission parameters at the first UE 115 have changed. As a result, the second UE 115 may attempt to apply a CSI filter between two CSI reports that are associated with different transmission parameters, which may lead to inaccurate CSI reports.

In the wireless communications system 100, a first UE 115 may request a CSI report from a second UE 115 via a sidelink channel. The first UE 115 may indicate, to the second UE 115, a CSI report configuration for the requested CSI report. In some examples, the first UE 115 may select the CSI report configuration based on one or more transmission parameters (e.g., a transmit power, a transmit antenna, a transmit beam) for transmitting CSI-RSs to the second UE 115. In some cases, the first UE 115 may transmit one or more CSI-RSs to the second UE 115 using the one or more transmit parameters. Based on receiving the one or more CSI-RSs, the second UE 115 may perform one or more channel measurements to determine a first set of channel quality measurements for the sidelink channel. The second UE 115 may also identify a second set of channel quality measurements (e.g., from previously generated CSI reports) associated with the indicated CSI report configuration. The second UE 115 may determine whether to filter (e.g., average) the first set of channel quality measurements with the second set of channel quality measurements based on whether the first and second set of channel quality measurements are generated according to a same CSI report configuration. The second UE 115 may then transmit the requested CSI report to the first UE 115 via the sidelink channel.

In some cases, the first UE 115 may update a CSI report configuration based on updating transmission parameters for the CSI-RSs. For example, if the first UE 115 adjusts a transmission parameter for CSI-RS transmissions, the first UE 115 may additionally indicate an updated CSI report configuration to the second UE 115. Thus, the second UE 115 may refrain from filtering the CSI reports across CSI-RSs transmitted with different parameters. Here, a reliability of the CSI reports may be improved (e.g., when compared to CSI reporting according to a single CSI reporting configuration).

Figure 2:
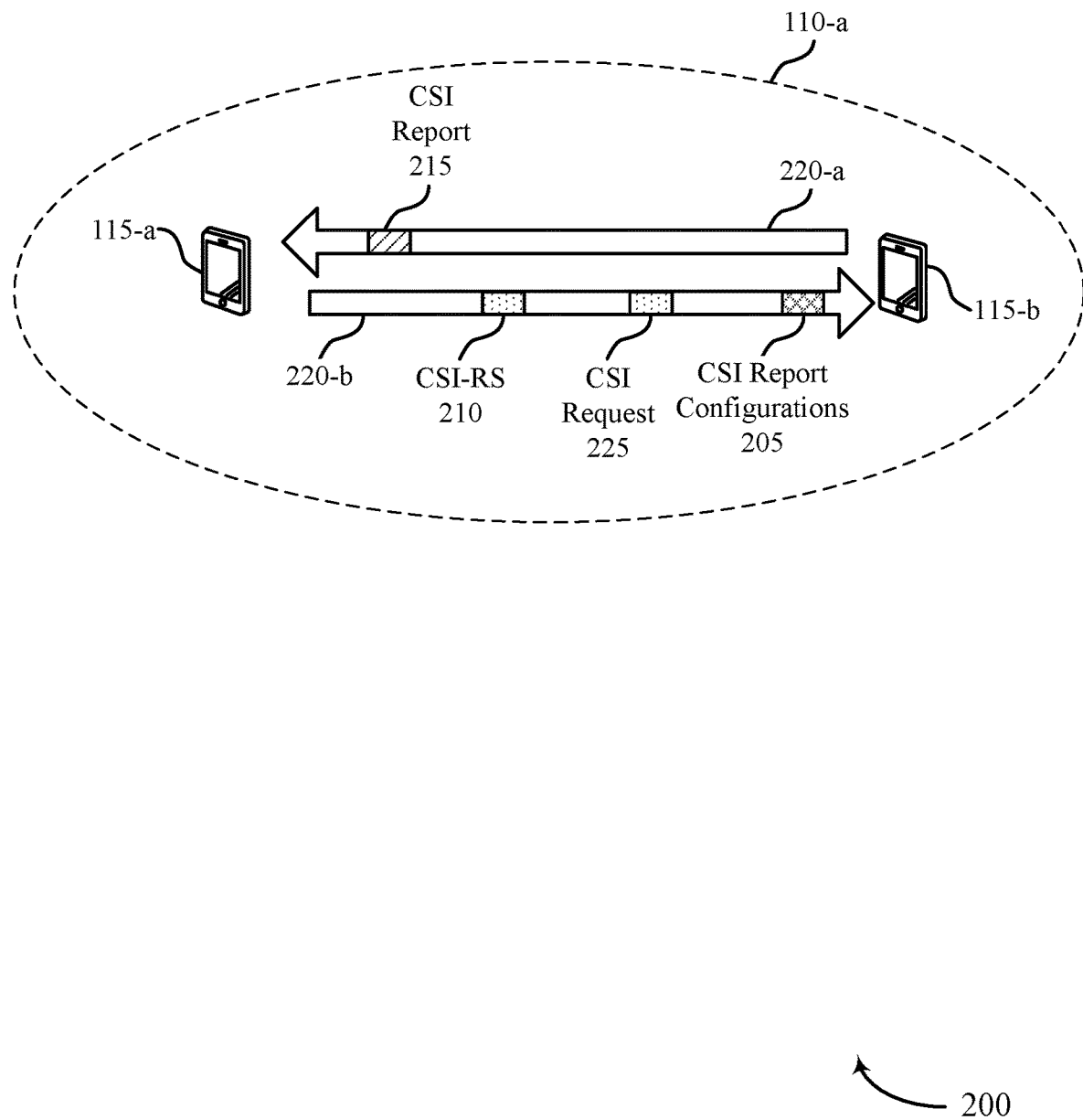

FIG. 2 illustrates an example of a wireless communications system 200 that supports channel state reporting for sidelink communications in accordance with aspects of the present disclosure. The wireless communications system 200 may implement or be implemented by aspects of wireless communications system 100. For example, the wireless communications system 200 may include a UE 115-a and a UE 115-b, which may be examples of a UE 115 as described with reference to FIG. 1. In wireless communications system 200, the UEs 115 may perform sidelink communications via communication links 220. Additionally, one or more of the UEs 115 may be configured to perform sidelink CSI reporting. That is, the ULE 115-a may transmit a CSI request 225 to the UE 115-b requesting (e.g., aperiodically) for the UE 115-b to transmit the CSI report 215 to the UE 115-a according to one of the CSI report configurations 205.

The UE 115-a may transmit signaling to the UE 115-b indicating a set of CSI report configurations 205. Additionally or alternatively, the UE 115-b may receive the signaling indicating the set of CSI report configurations 205 from another device (e.g., a base station). In either case, the UE 115-b may receive signaling indicating multiple (e.g., K) CSI report configurations 205 (e.g., settings). In some examples, the signaling indicating the set of CSI report configurations 205 may indicate for the UE 115-b to maintain multiple (e.g., K) CSI report configurations for each unicast link between the UE 115-a and the UE 115-b. In some cases, the signaling indicating the set of CSI report configurations 205 may additionally configure one or more transmission configuration indicator (TCI) states for the UE 115-b. For example, the UE 115-b may be associated with multiple different TCI states for receiving sidelink communications from UE 115-a (e.g., in a PC-5 RRC connection). In some examples, the signaling indicating the set of CSI report configurations 205 may additionally indicate a CSI report configuration 205 for each configured TCI.

The UE 115-a may transmit a CSI request 225 (e.g., requesting a CSI report 215 from the UE 115-b) to the UE 115-b via the communication link 220-b. When transmitting the CSI request 225, the UE 115-a may indicate one of the CSI report configurations 205 for the CSI report 215. For example, the UE 115-a may indicate the one CSI report configuration 205 via field in a sidelink control information (SCI) message (e.g., using a number (e.g., $\log_2(1+K)$) of bits in the SCI message). Additionally or alternatively, the UE 115-a may indicate a specific TCI state to the UE 115-b in the CSI request 225 (e.g., for receiving the CSI-RS 210). Here, the UE 115-a may determine the one CSI report configuration 205 based on the TCI state indicated by the CSI request 225.

In some examples, the UE 115-a may refrain from transmitting the CSI request 225 (e.g., triggering another aperiodic CSI report 215) associated with the CSI report configuration 205 from the UE 115-b before a last slot of an expected reception window of the CSI report 215 or before completion of another ongoing CSI report 215 associated with the CSI report configuration 205. However, the UE 115-a (e.g., the CSI triggering UE) may simultaneously trigger the UE 115-b (e.g., the CSI reporting UE) to transmit multiple CSI reports 215 associated with different CSI report configurations 205 (e.g., using different sidelink grants or SCI messages for the CSI request 225). For example, if the UE 115-a triggers the UE 115-b to report a first CSI report 215 (e.g., an aperiodic CSI report 215) with a first CSI report configuration 205, the UE 115-a may also trigger the UE 115-b to report a second CSI report 215 with a second CSI report configuration 205 prior to receiving the first CSI report 215 from the UE 115-b.

The UE 115-a may transmit a CSI-RS 210 to the UE 115-b. In some cases, the CSI-RS 210 may include one or more other types of reference signals (e.g., in addition or alternative to the CSI-RS 210). For example, if CSI reporting is enabled by a higher layer parameter (e.g., sl-CSI-Acquisition) and a field (e.g., a "CSI request" field) in a corresponding SCI format (e.g., 2-A) is set to a specific value (e.g., 1), the UE 115-a may transmit the CSI-RS 210 via a physical sidelink shared channel (PSSCH) transmission.

In some examples, the UE 115-a may be able to perform simultaneous uplink and sidelink transmissions (or simultaneous sidelink and sidelink transmissions) on different CCs. Additionally or alternatively, the UE 115-a may be capable of using sidelink carrier aggregation (CA) to integrate sidelink communications across different CCs. As an example, the UE 115-a may be scheduled to simultaneously transmit an uplink transmission and the one or more CSI-RSs 210. In some examples, the UE 115-a may scale down a sidelink transmit power of the one or more CSI-RSs 210 if a total transmit power of the uplink transmission and the one or more CSI-RSs 210 exceeds a first threshold transmit power (e.g., an overall maximum power) of the UE 115-a. If the scaled transmit power of the one or more CSI-RSs 210 (or a scaled transmit power of a PSSCH transmission scheduling the CSI report 215) is less than a second threshold transmit power (e.g., a minimum guaranteed power), the UE 115-a may refrain from triggering the CSI report 215 (e.g., by refraining from transmitting the CSI request 225) or transmitting the one or more CSI-RSs 210.

The UE 115-b may generate the CSI report 215 based on receiving the CSI-RS 210. For example, the UE 115-b may measure one or more channel qualities associated with the CSI-RS 210 received from the UE 115-a. For example, the UE 115-b may determine one or more of a channel quality indicator (CQI) or a rank indicator (RI) associated with the CSI-RS 210 and include one or more of the determined channel quality measurements in the CSI report 215.

The UE 115-b may refrain from applying a filter across CSI reports 215 with different CSI report configurations 205. In some examples, the UE 115-a may selectively filter across CSI reports 215 for the same CSI report configurations 205. For example, the UE 115-b may filter the CSI report 215 with other CSI reports 215 that are associated with the same CSI report configuration 205. Additionally, the UE 115-b may refrain from filtering CSI reports 215 that are associated with different TCI states and may selectively filter CSI reports 215 that are associated with the same TCI state and the same triggering device (e.g., the UE 115-a).

The UE 115-b may transmit the CSI report 215 to the UE 115-a based on generating the CSI report 215. For example, the UE 115-b may transmit the CSI report 215 to the UE 115-a via a MAC-control element (CE). In some cases, a sidelink CSI reporting MAC-CE may be identified by a MAC subheader with a logical channel identifier (LCID). A priority of the sidelink CSI reporting MAC-CE may be fixed to a specific value (e.g., '1'). The sidelink CSI reporting MAC-CE may include one or more fields, such as an RI field, a CQI field, and a set of reserved bits that are set to a specific value (e.g., 0). The RI field may indicate a derived value of an RI for sidelink CSI reporting and may have a length of 1 bit. Similarly, the CQI field may indicate a derived value of a CQI for sidelink CSI reporting and may have a length of 4 bits.

In some examples, when reporting the CSI report 215 back to the UE 115-a (e.g., via a MAC-CE), the UE 115-b may indicate an index of the CSI report configuration 205 in the CSI report 215. If, for example, the UE 115-a triggers the UE 115-a to report multiple CSI reports 215 with different CSI report configurations 205, the UE 115-b may include multiple CSI MAC-CEs (e.g., corresponding to the multiple CSI reports 215) in a single PSSCH transmission. In such examples, if each CSI MAC-CE includes a corresponding CSI configuration index, the UE 115-a may use the CSI configuration indices to determine which CSI reports 215 correspond to which CSI report configurations 205.

The described techniques may enable the UE 115-b to generate the CSI report 215 with improved accuracy and greater efficiency, among other benefits. For example, the described techniques may enable the UE 115-b to generate the CSI report 215 with improved accuracy based on filtering the CSI report 215 with other CSI reports associated with the CSI report configuration 205. The described techniques may also enable the UE 115-b to transmit multiple CSI reports 215 in a single PSSCH transmission instead of transmitting a PSSCH transmission for each CSI report 215. Including multiple CSI reports 215 in a PSSCH transmission may reduce power consumption and decrease signaling overhead at the UE 115-b.

Figure 3:
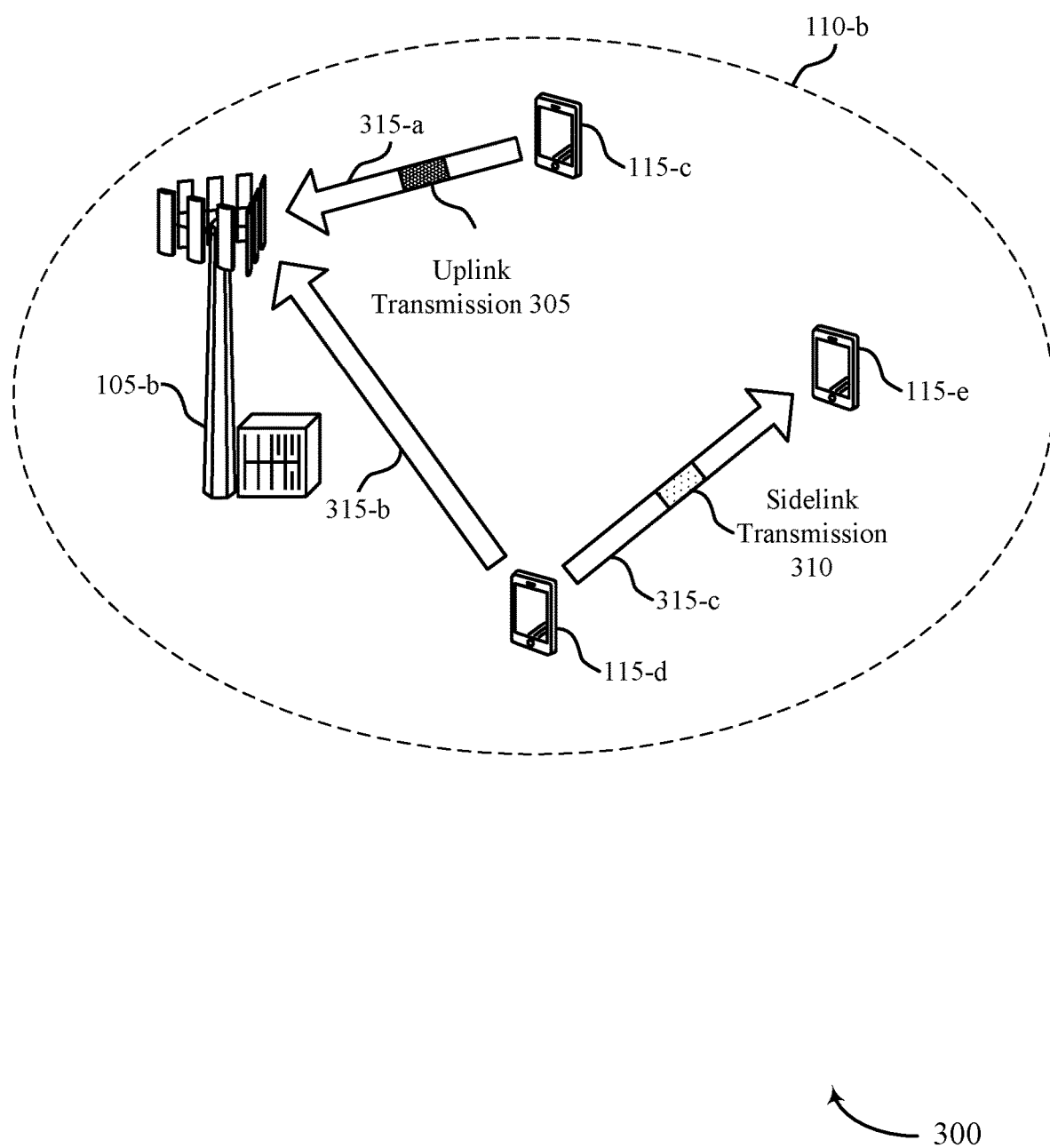

FIG. 3 illustrates an example of a wireless communications system 300 that supports channel state reporting for sidelink communications in accordance with aspects of the present disclosure. The wireless communications system 300 may implement or be implemented by aspects of the wireless communications system 100 or the wireless communications system 200. For example, the wireless communications system 300 may include a UE 115-c, a UE 115-d, a UE 115-d, and a base station 105-b, which may be examples of corresponding devices described with reference to FIGS. 1 and 2. The UEs 115 and the base station 105-b may communicate over a communication link 315-a, a communication link 315-b, and a communication link 315-c, which may be examples of a communication link 125 or a communication link 220 as described with reference to FIGS. 1 and 2. The UEs 115 and the base station 105-b may communicate within a geographic coverage area 110-b of the base station 105-b, which may be an example of a geographic coverage area 110 or a geographic coverage area 110-a as described with reference to FIGS. 1 and 2.

In the wireless communications system 300, the UE 115-d may be scheduled to transmit a sidelink transmission 310 to the UE 115-e over the communication link 315-c. Similarly, the UE 115-c may be scheduled to transmit an uplink transmission 305 to the base station 105-b over the communication link 315-a. In some examples, base station 105-b may experience interference from the sidelink transmission 310 over the communication link 315-b. For example, if the UE 115-d transmits the sidelink transmission 310 to the UE 115-e while the base station 105-b is attempting to receive the uplink transmission 305 from the UE 115-c, the sidelink transmission 310 may interfere with the uplink transmission 305 at the base station 105-b. As a result, the base station 105-b may be unable to successfully receive and decode the uplink transmission 305.

In some examples, if the UE 115-d determines that the sidelink transmission 310 overlaps with the uplink transmission 305 (e.g., in the time-domain), the UE 115-d may dynamically adjust a transmit power of the sidelink transmission 310 such that the base station 105-b experiences relatively less interference from the sidelink transmission 310. For example, the UE 115-d may decrease the transmit power of the sidelink transmission from a first transmit power (e.g., P1) to a nominal transmit power (e.g., P2). In some examples, the UE 115-d may determine the first transmit power based on a first expression (e.g., $P_1=\min\{P_s, P_D\}$) and may determine the nominal transmit power based on a second expression (e.g., $P_2=P_s$). The first and second expressions may be derived from Equations 1 and 2, shown below.

$$P_S = P_{0,S} + 10 \log_{10}(2^\mu \cdot M_{RB}(S)) + \alpha_S \cdot PL_S \qquad (1)$$

$$P_D = P_{0,D} + 10 \log_{10}(2^\mu \cdot M_{RB}(i)) + \alpha_D \cdot PL_D \qquad (2)$$

In Equations 1 and 2, $P_S$ may be a sidelink transmit power, $P_D$ may be a downlink transmit power, $P_{0,S}$ may be an initial sidelink transmit power (e.g., p0-SL-PSCCHPSSCH), $P_{0,D}$ may be an initial downlink transmit power (e.g., p0-DL-PSCCHPSSCH), $\alpha_S$ may be a sidelink pathloss coefficient (e.g., alpha-SL-PSCCHPSSCH), $\alpha_D$ may be a downlink pathloss coefficient (e.g., alpha-DL-PSCCHPSSCH), $PL_S$ may be a sidelink pathloss value, $PL_D$ may be a downlink pathloss value, $\mu$ may be an exponential factor, and $M_{RB}(i)$ may be a resource block.

In some examples, the sidelink transmission 310 may include a request for a CSI report from the UE 115-e. When requesting the CSI report, the UE 115-d (e.g., the transmitting UE) may indicate whether the CSI report is triggered for a CSI report setting that corresponds to the first transmit power (e.g., P1) or the nominal transmit power (e.g., P2). Accordingly, the UE 115-e (e.g., the receiving UE) may generate the CSI report based on the indicated CSI report setting, as described with reference to FIG. 2. For example, the UE 115-e may filter the CSI report with other CSI reports associated with the same transmit power.

Indicating a CSI report setting for a CSI report in accordance with techniques describe herein may enable the UE 115-e to generate the CSI report with improved accuracy based on filtering the CSI report with other CSI reports associated with the same CSI report setting. For example, if the UE 115-d determines channel quality measurements to include in the CSI report based on measuring CSI-RSs transmitted with a nominal transmit power, the UE 115-d may use the indicated CSI report setting to filter the channel quality measurements with one or more previously determined channel quality measurements corresponding to the nominal transmit power. Filtering the channel quality measurements based on the indicated CSI report setting may enable the UE 115-d to generate CSI reports with relatively higher accuracy, among other benefits.

Figure 4:
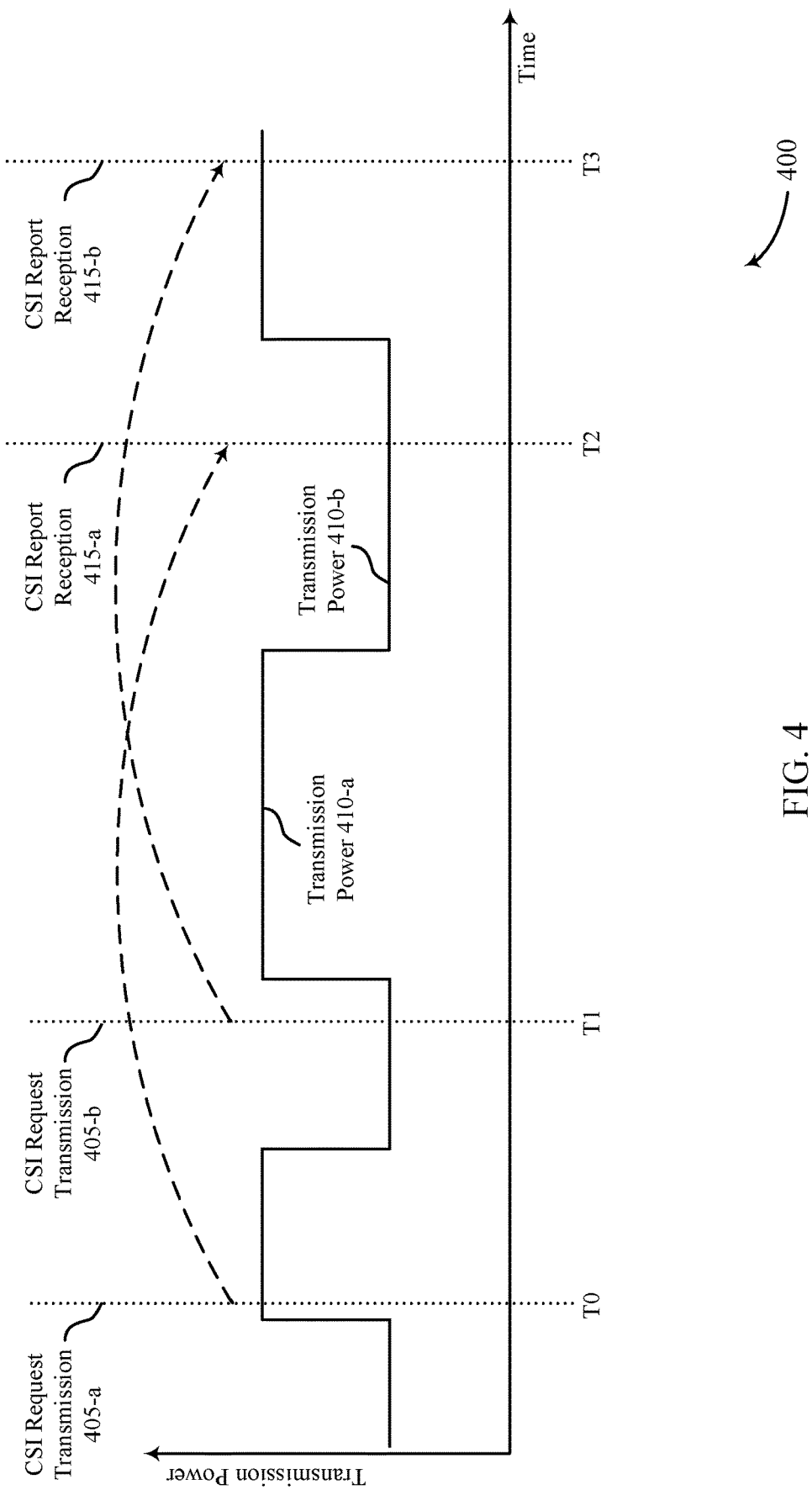
FIG. 4 illustrates an example of a transmission schedule that supports channel state reporting for sidelink communications in accordance with aspects of the present disclosure.

FIG. 4 illustrates an example of a transmission schedule 400 that supports channel state reporting for sidelink communications in accordance with aspects of the present disclosure. The transmission schedule 400 may implement or be implemented by aspects of the wireless communications system 100, the wireless communications system 200, or the wireless communications system 300. For example, the transmission schedule 400 may be implemented by one or more UEs, which may be examples of corresponding devices described with reference to FIGS. 1 through 3. In accordance with the transmission schedule 400, a first UE may transmit CSI-RSs to a second UE using different transmit powers.

In some examples, the first UE (e.g., a UE requesting a CSI report from a second UE) may operate using different transmit powers, as described with reference to FIG. 3. More specifically, the first UE may switch between a first transmit power 410-a and a second transmit power 410-b (e.g., a nominal transmit power) based on a number of communication factors. For example, the first UE may switch from the first transmit power 410-a to the second transmit power 410-b to reduce the likelihood of transmissions from the first UE interfering with other devices (e.g., a base station). In some other examples, the first UE may be scheduled to simultaneously transmit multiple transmissions (e.g., an uplink transmission and a sidelink transmission) and may decrease a transmit power for at least one of the multiple transmissions from the first transmit power 410-a to the second transmit power 410-b such that an overall transmit power of the multiple transmissions is below a threshold transmit power of the first UE. Although shown with two different transmit powers, it is to be understood that the first UE may be capable of using any number of different transmit powers.

In some examples, the first UE may use the first transmit power 410-a for the CSI request transmission 405-a at time T0 (e.g., to the second UE) to trigger a first CSI report from the second UE. For example, the first UE may transmit, to the second UE, a scheduling SCI message that indicates a request for the first CSI report and a CSI report configuration associated with the first CSI report. In some examples, the first UE may switch from the first transmit power 410-a to the second transmit power 410-b (e.g., to mitigate interference or to reduce an overall transmit power) and may use the second transmit power 410-b for the CSI request transmission 405-b at time T1 (e.g., to trigger a second CSI report from the second UE time T1). In some examples, if the first and second CSI reports are associated with different CSI report configurations, the first UE may trigger the second CSI report prior to receiving the first CSI report from the second UE. Alternatively, if the first and second CSI reports are associated with the same CSI report configuration, the first UE may refrain from triggering the second CSI report until the first UE has received the first CSI report from the second UE.

In some examples, if the first UE triggers the first CSI report at time T0, the first UE may expect the first CSI report reception 415-a from the second UE prior to time T2. Similarly, if the first UE triggers the second CSI report at the time T1, the first UE may expect to receive the second CSI report reception 415-b from the second UE prior to time T3. In some examples, if the first and second CSI reports are associated with the same CSI report configuration and the first UE does not receive the first CSI report from the second UE prior to the time T2, the first UE may trigger the second CSI report at the time T2 (e.g., after an expected reception window of the first CSI report has expired).

Additionally or alternatively, if the first and second CSI reports are associated with the same CSI report configuration, the second UE may filter a first set of channel quality measurements (e.g., a CQI, an RI) from the first CSI report with a second set of channel quality measurements from the second CSI report. For example, if the first CSI report includes a first CQI value and the second CSI report includes a second CQI value, the second UE may determine an average CQI value based on the first and second CQI values and may transmit the average CQI value in the second CSI report (e.g., if the second UE transmits the second CSI report after the first CSI report).

In some examples, if the first and second CSI reports are associated with different CSI report configurations and the first UE triggers the second CSI report prior to receiving the first CSI report, the second UE may transmit the first CSI report and the second CSI report in a single PSSCH transmission. More specifically, the second UE may transmit a PSSCH transmission that includes a first MAC-CE and a second MAC-CE, where the first MAC-CE includes the first CSI report and the second MAC-CE includes the second CSI report. In some examples, the first MAC-CE may include an index of a CSI report configuration associated with the first CSI report and the second MAC-CE may include an index of a CSI report configuration associated with the second CSI report. The first UE may use these indices to determine which CSI reports correspond to which CSI report configurations.

In some examples (e.g., if the second UE is using sidelink CA), the first CSI report may be associated with a first CC and the second CSI report may be associated with a second CC. The second UE may transmit the first MAC-CE via the first CC and may transmit the second MAC-CE via the second CC. In some cases, the second UE may transmit the first MAC-CE and the second MAC-CE in the same PSSCH transmission via the first CC, the second CC, or both. Here, the first MAC-CE may include an indication of a first cell index associated with the first CSI report (e.g., and the first CC) and the second MAC-CE may include an indication of a second cell index associated with the second CSI report (e.g., and the second CC). The first UE may identify the first CSI report based on the indication of the first cell index and may identify the second CSI report based on the indication of the second cell index. In other cases, the second UE may include the first CSI report and the second CSI report in a same MAC-CE (e.g., a multi-CSI MAC-CE). For example, a MAC-CE may include a first set of fields corresponding to the first CSI report and a second set of fields corresponding to the second CSI report.

The described techniques may enable the second UE to generate CSI reports with improved accuracy and greater efficiency, among other benefits. For example, the described techniques may enable the second UE to transmit multiple CSI reports in a single PSSCH transmission instead of transmitting a PSSCH transmission for each CSI report. Including multiple CSI reports in a PSSCH transmission may reduce power consumption and decrease signaling overhead at the second UE. In addition, the second UE may generate a CSI report with improved accuracy based on receiving an indication of a CSI report configuration for the CSI report and using the indication to filter the CSI report with other CSI reports associated with the same CSI report configuration.

Figure 5:
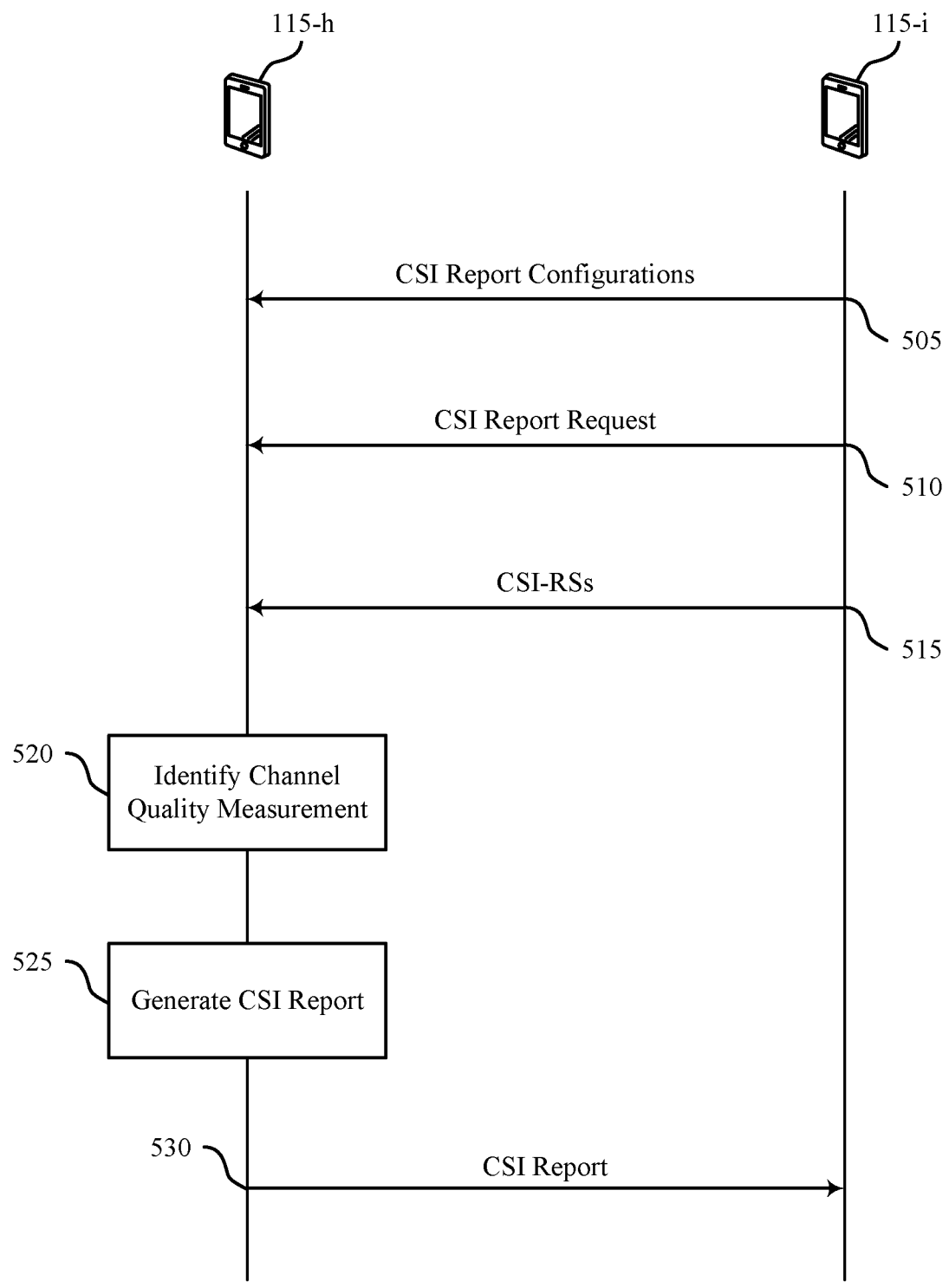
FIG. 5 illustrates an example of a process flow that supports channel state reporting for sidelink communications in accordance with aspects of the present disclosure.

FIG. 5 illustrates an example of a process flow 500 that supports channel state reporting for sidelink communications in accordance with aspects of the present disclosure. The process flow 500 may implement or be implemented by aspects of the wireless communications system 100, the wireless communications system 200, or the wireless communications system 300. For example, the process flow 500 may include a UE 115-h and a UE 115-i, which may be examples of corresponding devices described with reference to FIGS. 1 through 3. In the following description of the process flow 500, operations between the UE 115-h and the UE 115-i may be performed in a different order or at a different time than as shown. Some operations may also be omitted from the process flow 500, and other operations may be added to the process flow 500. In accordance with the process flow 500, the UE 115-h may generate a CSI report based on receiving an indication of a CSI report configuration for the CSI report from the UE 115-i.

At 505, the UE 115-h may receive signaling that indicates multiple CSI report configurations for sidelink communications between the UE 115-h and the UE 115-i. At 510, the UE 115-h may receive a first request for a first CSI report from the UE 115-i. The request may include an indication of a first CSI report configuration for the first CSI report. For example, the UE 115-h may receive a scheduling SCI message that includes the first request and a control field indicating the first CSI report configuration. Alternatively, the scheduling SCI message may indicate a TCI state of the UE 115-i. The UE 115-h may determine the first CSI report configuration based on the indicated TCI state of the UE 115-i. In some examples, the first CSI report configuration may be one of the multiple CSI report configurations indicated at 505. The UE 115-h may also receive a second request for a second CSI report from the UE 115-i. The second request may include an indication of a second CSI report configuration that is the same or different from the first CSI report configuration. In some examples, if the second CSI report configuration is different from the first CSI report configuration, the UE 115-h may receive the second request prior to transmitting the first CSI report. Alternatively, if the second CSI report configuration is the same as the first CSI report configuration, the UE 115-i may refrain from requesting the second CSI report until the UE 115-i receives the first CSI report from the UE 115-h.

In some examples, the UE 115-i may identify a time overlap between a scheduled transmission (e.g., an uplink transmission) and the first request. The UE 115-i may identify a scaled (e.g., reduced) transmission power for transmitting the first request based on the identified time overlap. The UE 115-i may determine whether to transmit the first request to the UE 115-h based on comparing the scaled transmission power to a threshold transmission power of the UE 115-i. If the scaled transmission power is below the threshold transmission power, the UE 115-i may refrain from transmitting the first request for the first CSI report to the UE 115-h.

At 515, the UE 115-i may transmit a first set of CSI-RSs to the UE 115-h. The UE 115-i may transmit the first set of CSI-RSs in accordance with the first CSI report configuration. For example, the UE 115-i may use a transmit power, a transmit beam, a transmit antenna, or a combination thereof corresponding to the first CSI report configuration. In some examples, the UE 115-i may also transmit a second set of CSI-RSs to the UE 115-h in accordance with the second CSI report configuration. Accordingly, the UE 115-h may receive the first set of CSI-RSs based on the first CSI report configuration and may receive the second set of CSI-RSs based on the second CSI report configuration.

At 520, the UE 115-h may identify a first set of channel quality measurements based on the first set of CSI-RSs, the first request, and the first CSI report configuration. For example, the UE 115-h may measure the first set of CSI-RSs according to the first CSI report configuration and may determine one or more of a CQI or an RI based on measuring the first set of CSI-RSs. In some examples, the UE 115-h may also identify a second set of channel quality measurements based on the second set of CSI-RSs, the second request, and the second CSI report configuration.

At 525, the UE 115-h may generate the first CSI report based on identifying the first set of channel quality measurements. In some examples, the UE 115-h may identify one or more previously generated CSI reports associated with the first CSI report configuration and may filter the first set of channel quality measurements with corresponding channel quality measurements from the one or more previously generated CSI reports. For example, the UE 115-h may determine an average CQI or an average RI based on filtering the first set of channel quality measurements. In some examples, the UE 115-h may generate the second CSI report based on filtering the second set of channel quality measurements with previously generated CSI reports associated with the second CSI report configuration.

At 530, the UE 115-h may transmit the first CSI report to the UE 115-i. In some examples, the UE 115-h may transmit the first CSI report via a first MAC-CE. The first CSI report may include the first set of filtered channel quality measurements. In some examples, the UE 115-h may transmit the second CSI report to the UE 115-i via a second MAC-CE, which may include the second set of filtered channel quality measurements. In some examples, the UE 115-h may transmit the first MAC-CE and the second MAC-CE in a single PSSCH transmission. The UE 115-h may include an index of the first CSI report configuration in the first MAC-CE and an index of the second CSI report configuration in the second MAC-CE such that the UE 115-i may determine which MAC-CE corresponds to which CSI report.

Figure 6:
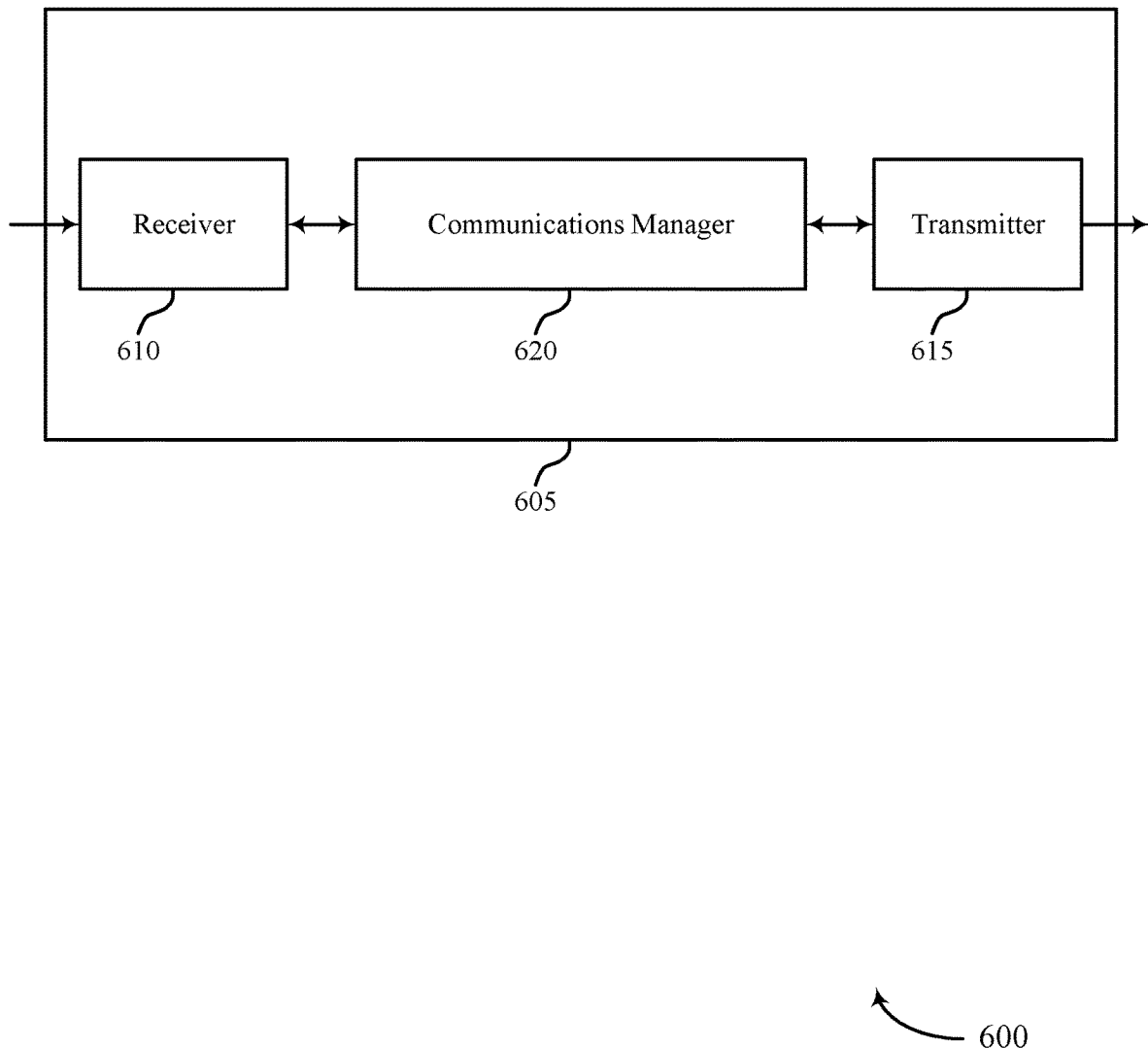
FIGS. 6 and 7 show block diagrams of devices that support channel state reporting for sidelink communications in accordance with aspects of the present disclosure.

FIG. 6 shows a block diagram 600 of a device 605 that supports channel state reporting for sidelink communications in accordance with aspects of the present disclosure. The device 605 may be an example of aspects of a device as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to channel state reporting for sidelink communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to channel state reporting for sidelink communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of channel state reporting for sidelink communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an ASIC, a field programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first device in accordance with examples as disclosed herein. For example, the communications manager 620 may be configured as or otherwise support a means for receiving signaling indicating a set of multiple CSI report configurations for sidelink communications between the first device and a second device. The communications manager 620 may be configured as or otherwise support a means for receiving, from the second device and based on receiving the signaling, a request for a CSI report according to a first CSI report configuration from the set of multiple CSI report configurations. The communications manager 620 may be configured as or otherwise support a means for transmitting, to the second device and based on receiving the request, the CSI report according to the first CSI report configuration.

Additionally or alternatively, the communications manager 620 may support wireless communication at a first device in accordance with examples as disclosed herein. For example, the communications manager 620 may be configured as or otherwise support a means for transmitting, to a second device, signaling indicating a set of multiple CSI report configurations for sidelink communications between the first device and the second device. The communications manager 620 may be configured as or otherwise support a means for transmitting, to the second device and based on transmitting the signaling, a request for a CSI report according to a first CSI report configuration from the set of multiple CSI report configurations. The communications manager 620 may be configured as or otherwise support a means for receiving, from the second device and based on transmitting the request, the CSI report according to the first CSI report configuration.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing and more efficient utilization of communication resources based on transmitting multiple CSI reports in a single PSSCH transmission.

Figure 7:
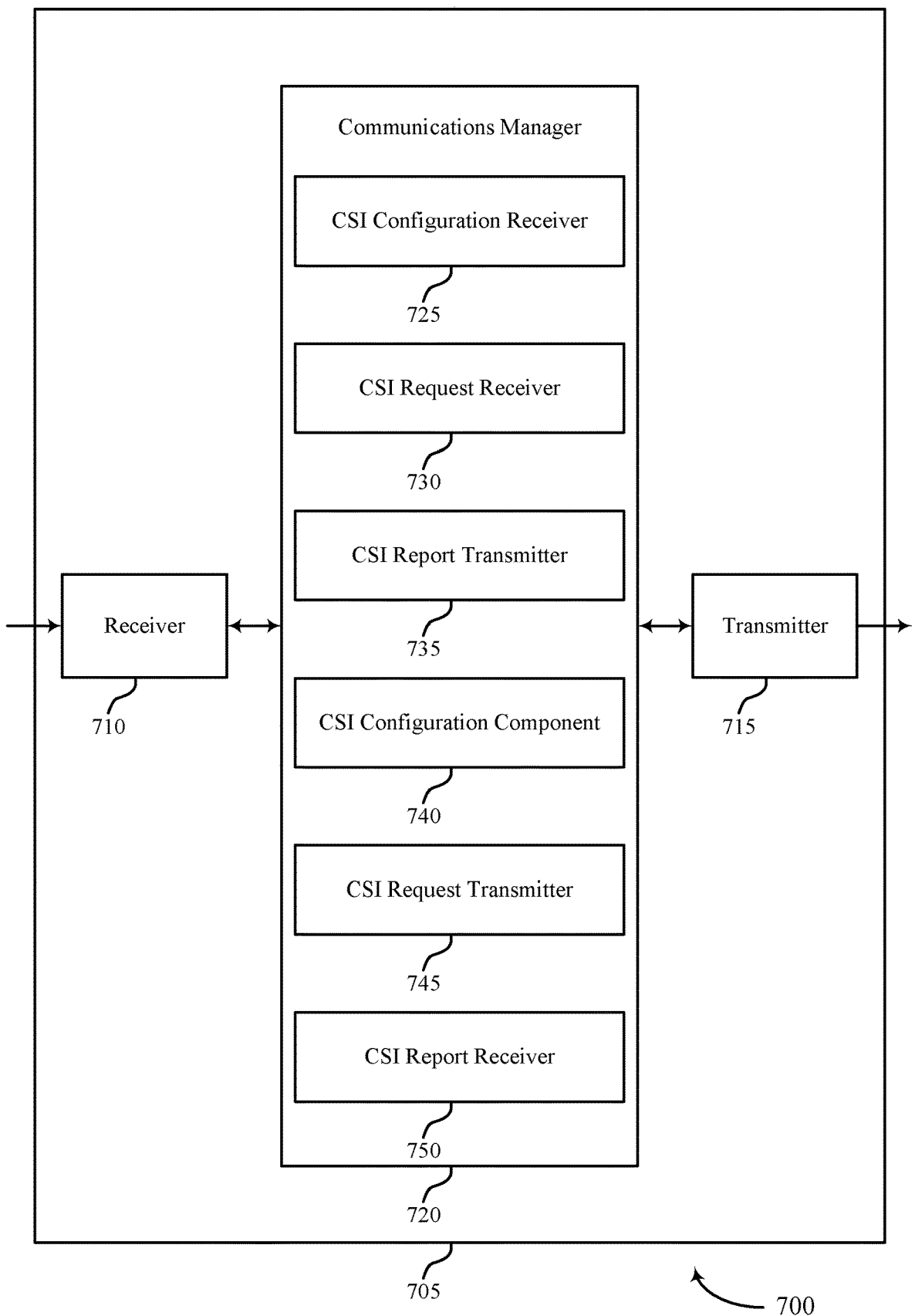

FIG. 7 shows a block diagram 700 of a device 705 that supports channel state reporting for sidelink communications in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to channel state reporting for sidelink communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to channel state reporting for sidelink communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of channel state reporting for sidelink communications as described herein. For example, the communications manager 720 may include a CSI configuration receiver 725, a CSI request receiver 730, a CSI report transmitter 735, a CSI configuration component 740, a CSI request transmitter 745, a CSI report receiver 750, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first device in accordance with examples as disclosed herein. The CSI configuration receiver 725 may be configured as or otherwise support a means for receiving signaling indicating a set of multiple CSI report configurations for sidelink communications between the first device and a second device. The CSI request receiver 730 may be configured as or otherwise support a means for receiving, from the second device and based on receiving the signaling, a request for a CSI report according to a first CSI report configuration from the set of multiple CSI report configurations. The CSI report transmitter 735 may be configured as or otherwise support a means for transmitting, to the second device and based on receiving the request, the CSI report according to the first CSI report configuration.

Additionally or alternatively, the communications manager 720 may support wireless communication at a first device in accordance with examples as disclosed herein. The CSI configuration component 740 may be configured as or otherwise support a means for transmitting, to a second device, signaling indicating a set of multiple CSI report configurations for sidelink communications between the first device and the second device. The CSI request transmitter 745 may be configured as or otherwise support a means for transmitting, to the second device and based on transmitting the signaling, a request for a CSI report according to a first CSI report configuration from the set of multiple CSI report configurations. The CSI report receiver 750 may be configured as or otherwise support a means for receiving, from the second device and based on transmitting the request, the CSI report according to the first CSI report configuration.

Figure 8:
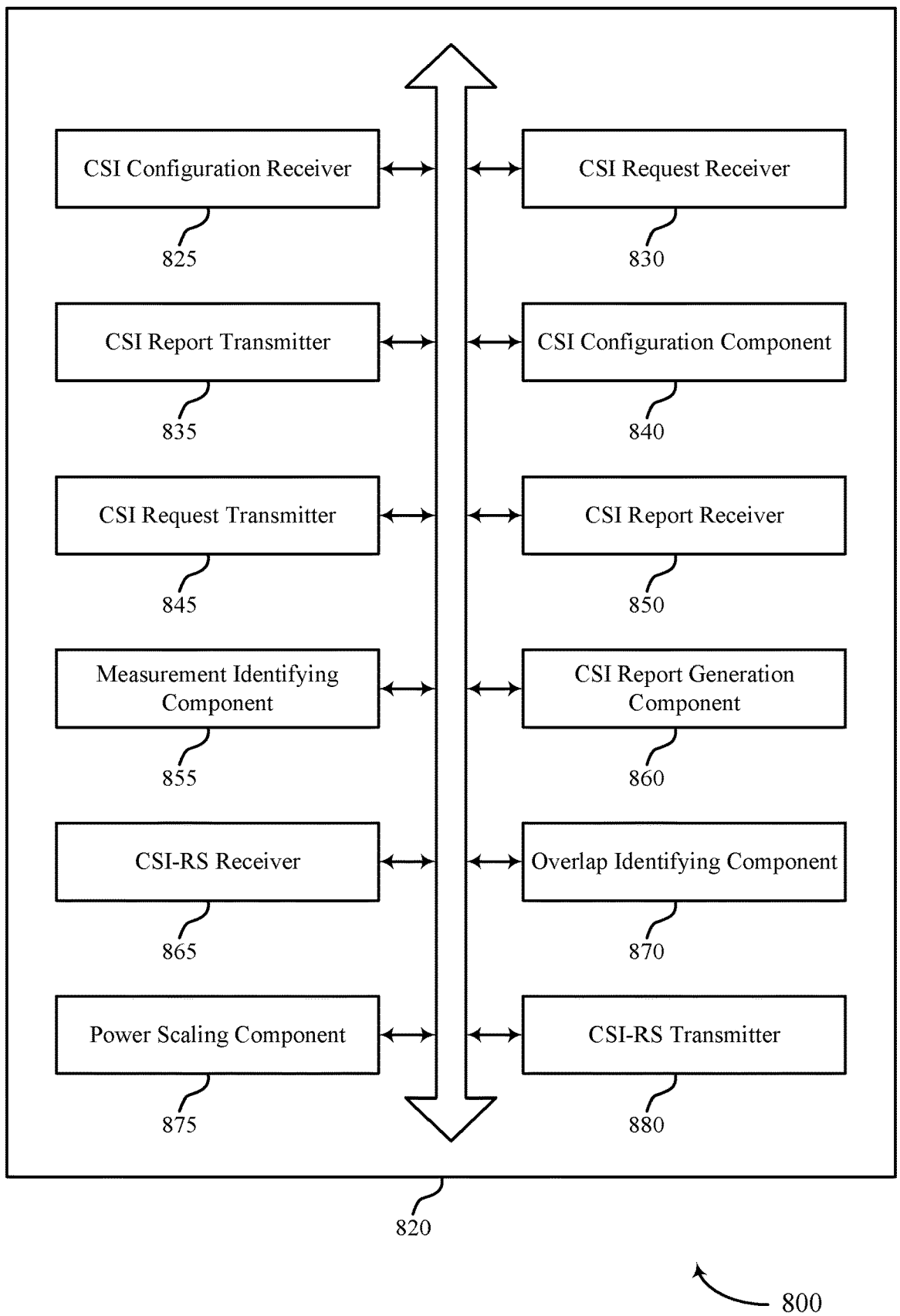
FIG. 8 shows a block diagram of a communications manager that supports channel state reporting for sidelink communications in accordance with aspects of the present disclosure.

FIG. 8 shows a block diagram 800 of a communications manager 820 that supports channel state reporting for sidelink communications in accordance with aspects of the present disclosure. The communications manager 820 may be an example of aspects of a communications manager 620, a communications manager 720, or both, as described herein. The communications manager 820, or various components thereof, may be an example of means for performing various aspects of channel state reporting for sidelink communications as described herein. For example, the communications manager 820 may include a CSI configuration receiver 825, a CSI request receiver 830, a CSI report transmitter 835, a CSI configuration component 840, a CSI request transmitter 845, a CSI report receiver 850, a measurement identifying component 855, a CSI report generation component 860, a CSI-RS receiver 865, an overlap identifying component 870, a power scaling component 875, a CSI-RS transmitter 880, or any combination thereof. Each of these components may communicate, directly or indirectly, with one another (e.g., via one or more buses).

The communications manager 820 may support wireless communication at a first device in accordance with examples as disclosed herein. The CSI configuration receiver 825 may be configured as or otherwise support a means for receiving signaling indicating a set of multiple CSI report configurations for sidelink communications between the first device and a second device. The CSI request receiver 830 may be configured as or otherwise support a means for receiving, from the second device and based on receiving the signaling, a request for a CSI report according to a first CSI report configuration from the set of multiple CSI report configurations. The CSI report transmitter 835 may be configured as or otherwise support a means for transmitting, to the second device and based on receiving the request, the CSI report according to the first CSI report configuration.

In some examples, to support receiving the request for the CSI report, the CSI request receiver 830 may be configured as or otherwise support a means for receiving, from the second device, SCI including one or more fields that indicate the first CSI report configuration.

In some examples, the measurement identifying component 855 may be configured as or otherwise support a means for identifying, based on receiving the request and according to the first CSI report configuration, a first channel quality measurement associated with the sidelink communications between the first device and the second device. In some examples, the CSI report generation component 860 may be configured as or otherwise support a means for generating the CSI report using the channel quality measurement identified according to the first CSI report configuration.

In some examples, the CSI request receiver 830 may be configured as or otherwise support a means for receiving, from the second device prior to receiving the request for the CSI report according to the first CSI report configuration, a second request for a second CSI report according to a second CSI report configuration from the set of multiple CSI report configurations. In some examples, the measurement identifying component 855 may be configured as or otherwise support a means for identifying, based on receiving the second request and according to the second CSI report configuration, a second channel quality measurement associated with the sidelink communications between the first device and the second device. In some examples, the CSI report generation component 860 may be configured as or otherwise support a means for determining whether to generate the CSI report using the second channel quality measurement identified according to the second CSI report configuration based on whether the second CSI report configuration is different from the first CSI report configuration, where transmitting the CSI report according to the first CSI report configuration is based on the determining.

In some examples, the CSI report generation component 860 may be configured as or otherwise support a means for generating the CSI report using the first channel quality measurement identified according to the first CSI report configuration and the second channel quality measurement identified according to the second CSI report configuration based on the second CSI report configuration being the same as the first CSI report configuration.

In some examples, the CSI request receiver 830 may be configured as or otherwise support a means for receiving, from the second device based on receiving the request for the CSI report according to the first CSI report configuration and prior to transmitting the CSI report, a second request for a second CSI report according to a second CSI report configuration from the set of multiple CSI report configurations, where the second CSI report configuration is different from the first CSI report configuration. In some examples, the CSI report transmitter 835 may be configured as or otherwise support a means for transmitting, to the second device and based on receiving the second request, the second CSI report according to the second CSI report configuration.

In some examples, to support transmitting the CSI report and transmitting the second CSI report, the CSI report transmitter 835 may be configured as or otherwise support a means for transmitting a PSSCH transmission including a first MAC-CE and a second MAC-CE, where the first MAC-CE includes the CSI report and a first indication of the first CSI report configuration, and where the second MAC-CE includes the second CSI report and a second indication of the second CSI report configuration.

In some examples, to support transmitting the CSI report and transmitting the second CSI report, the CSI report transmitter 835 may be configured as or otherwise support a means for transmitting a PSSCH transmission including a MAC-CE, where the MAC-CE includes the CSI report and the second CSI report.

In some examples, to support transmitting the CSI report, the CSI report transmitter 835 may be configured as or otherwise support a means for transmitting the CSI report including an indication of the first CSI report configuration. In some examples, the first CSI report configuration may be associated with a first CC and the second CSI report configuration may be associated with a second CC. In some examples, the first MAC-CE may include an indication of a first cell index associated with the CSI report and the second MAC-CE may include an indication of a second cell index associated with the second CSI report.

In some examples, the signaling indicating the set of multiple CSI report configurations indicates a respective TCI state, from a set of multiple TCI states associated with the first device for the sidelink communications between the first device and the second device, corresponding to each of the set of multiple CSI report configurations. In some examples, the request for the CSI report includes an indication of a first TCI state from the set of multiple TCI states corresponding to the first CSI report configuration. In some examples, transmitting the CSI report according to the first CSI report configuration is based on the request for the CSI report including the indication of the first TCI state.

In some examples, the CSI-RS receiver 865 may be configured as or otherwise support a means for receiving, from the second device, a CSI-RS based on the request for the CSI report and the first CSI report configuration, where transmitting the CSI report is based on receiving the CSI-RS.

Additionally or alternatively, the communications manager 820 may support wireless communication at a first device in accordance with examples as disclosed herein. The CSI configuration component 840 may be configured as or otherwise support a means for transmitting, to a second device, signaling indicating a set of multiple CSI report configurations for sidelink communications between the first device and the second device. The CSI request transmitter 845 may be configured as or otherwise support a means for transmitting, to the second device and based on transmitting the signaling, a request for a CSI report according to a first CSI report configuration from the set of multiple CSI report configurations. The CSI report receiver 850 may be configured as or otherwise support a means for receiving, from the second device and based on transmitting the request, the CSI report according to the first CSI report configuration.

In some examples, to support transmitting the request for the CSI report, the CSI request transmitter 845 may be configured as or otherwise support a means for transmitting, to the second device, SCI including one or more bits that indicate the first CSI report configuration.

In some examples, the CSI request transmitter 845 may be configured as or otherwise support a means for transmitting, to the second device based on transmitting the request for the CSI report according to the first CSI report configuration and prior to receiving the CSI report, a second request for a second CSI report according to a second CSI report configuration from the set of multiple CSI report configurations, where the second CSI report configuration is different from the first CSI report configuration. In some examples, the CSI report receiver 850 may be configured as or otherwise support a means for receiving, from the second device and based on transmitting the second request, the second CSI report according to the second CSI report configuration.

In some examples, to support receiving the CSI report and receiving the second CSI report, the CSI report receiver 850 may be configured as or otherwise support a means for receiving a physical sidelink shared channel transmission including a first MAC-CE and a second MAC-CE, where the first MAC-CE includes the CSI report and a first indication of the first CSI report configuration, and where the second MAC-CE includes the second CSI report and a second indication of the second CSI report configuration.

In some examples, to support receiving the CSI report, the CSI report receiver 850 may be configured as or otherwise support a means for receiving the CSI report including an indication of the first CSI report configuration.

In some examples, the signaling indicating the set of multiple CSI report configurations indicates a respective TCI state, from a set of multiple TCI states associated with the first device for the sidelink communications between the first device and the second device, corresponding to each of the set of multiple CSI report configurations. In some examples, the request for the CSI report includes an indication of a first TCI state from the set of multiple TCI states corresponding to the first CSI report configuration. In some examples, receiving the CSI report according to the first CSI report configuration is based on the request for the CSI report including the indication of the first TCI state.

In some examples, the overlap identifying component 870 may be configured as or otherwise support a means for identifying that a scheduled transmission associated with a first transmission power and the request for the CSI report at least partially overlap in time. In some examples, the power scaling component 875 may be configured as or otherwise support a means for identifying a scaled transmission power for transmitting the request for the CSI report to the second device based on the scheduled transmission and the request for the CSI report at least partially overlapping in time. In some examples, the CSI request transmitter 845 may be configured as or otherwise support a means for determining whether to transmit the request for the CSI report based on whether a sum of the first transmission power and the scaled transmission power exceeds a threshold transmit power, where transmitting the request for the CSI report is based on the sum being less than the threshold transmit power.

In some examples, the CSI configuration component 840 may be configured as or otherwise support a means for selecting, from the set of multiple CSI report configurations, the first CSI report configuration for the CSI report based on a transmission power level of a CSI-RS, where transmitting the request for the CSI report is based on the selecting. In some examples, the CSI-RS transmitter 880 may be configured as or otherwise support a means for transmitting, to the second device, the CSI-RS according to the transmission power level, where receiving the CSI report is based on transmitting the CSI-RS.

Figure 9:
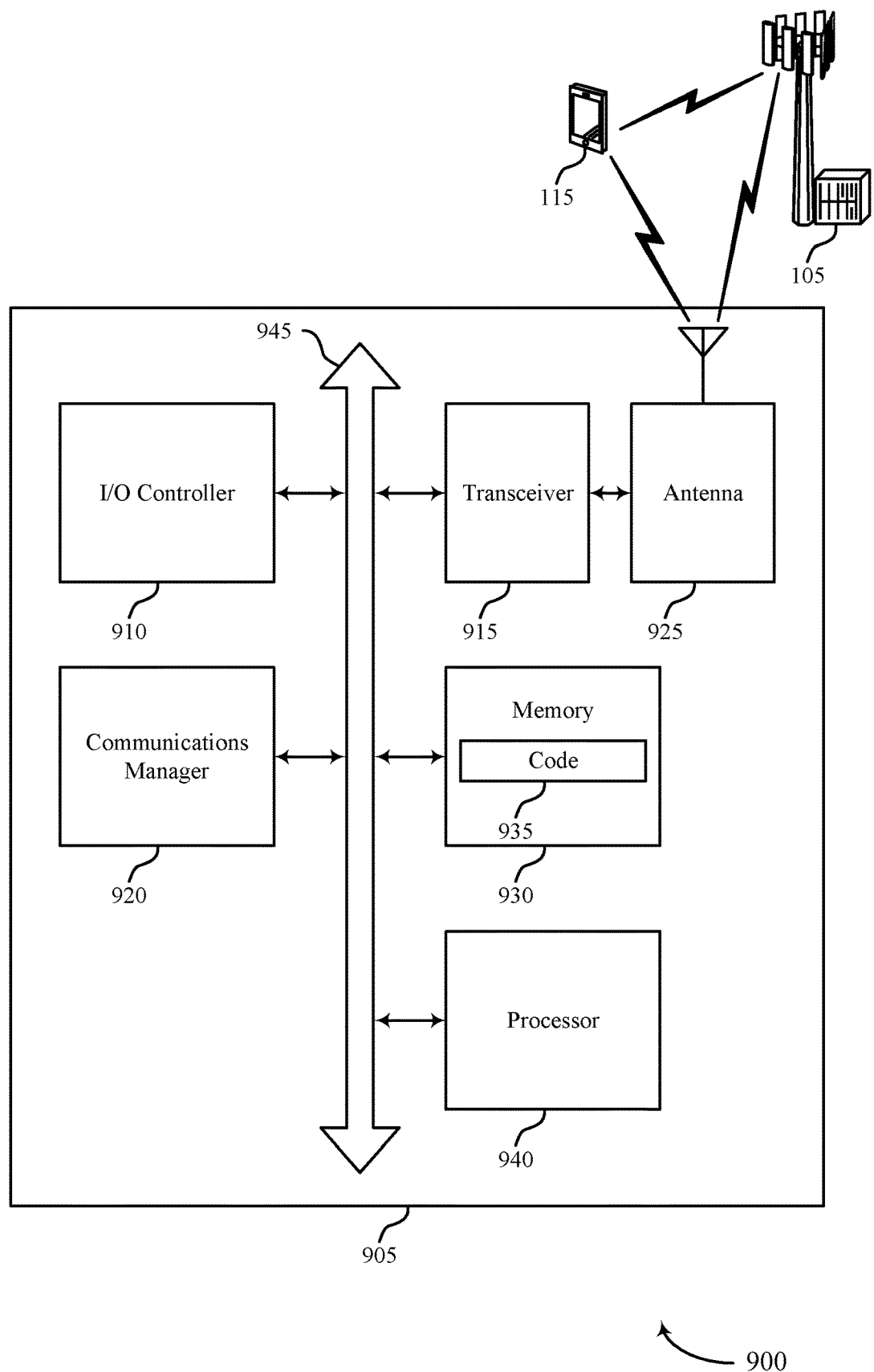
FIG. 9 shows a diagram of a system including a device that supports channel state reporting for sidelink communications in accordance with aspects of the present disclosure.

FIG. 9 shows a diagram of a system 900 including a device 905 that supports channel state reporting for sidelink communications in accordance with aspects of the present disclosure. The device 905 may be an example of or include the components of a device 605, a device 705, or a device as described herein. The device 905 may include components for bi-directional voice and data communications including components for transmitting and receiving communications, such as a communications manager 920, an I/O controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and ROM. The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic input/output system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting channel state reporting for sidelink communications). For example, the device 905 or a component of the device 905 may include a processor 940 and memory 930 coupled to the processor 940, the processor 940 and memory 930 configured to perform various functions described herein.

The communications manager 920 may support wireless communication at a first device in accordance with examples as disclosed herein. For example, the communications manager 920 may be configured as or otherwise support a means for receiving signaling indicating a set of multiple CSI report configurations for sidelink communications between the first device and a second device. The communications manager 920 may be configured as or otherwise support a means for receiving, from the second device and based on receiving the signaling, a request for a CSI report according to a first CSI report configuration from the set of multiple CSI report configurations. The communications manager 920 may be configured as or otherwise support a means for transmitting, to the second device and based on receiving the request, the CSI report according to the first CSI report configuration.

Additionally or alternatively, the communications manager 920 may support wireless communication at a first device in accordance with examples as disclosed herein. For example, the communications manager 920 may be configured as or otherwise support a means for transmitting, to a second device, signaling indicating a set of multiple CSI report configurations for sidelink communications between the first device and the second device. The communications manager 920 may be configured as or otherwise support a means for transmitting, to the second device and based on transmitting the signaling, a request for a CSI report according to a first CSI report configuration from the set of multiple CSI report configurations. The communications manager 920 may be configured as or otherwise support a means for receiving, from the second device and based on transmitting the request, the CSI report according to the first CSI report configuration.

By including or configuring the communications manager 920 in accordance with examples as described herein, the device 905 may support techniques for improved communication reliability based on receiving an indication of a CSI report configuration for a requested CSI report and using the CSI report configuration to generate the requested CSI report with relatively greater accuracy. As a result, the device 905 may be able to estimate channel conditions (e.g., of a sidelink channel) with relatively greater accuracy, which may enable the device 905 to communicate with other devices with improved reliability, among other benefits.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of channel state reporting for sidelink communications as described herein, or the processor 940 and the memory 930 may be otherwise configured to perform or support such operations.

Figure 10:
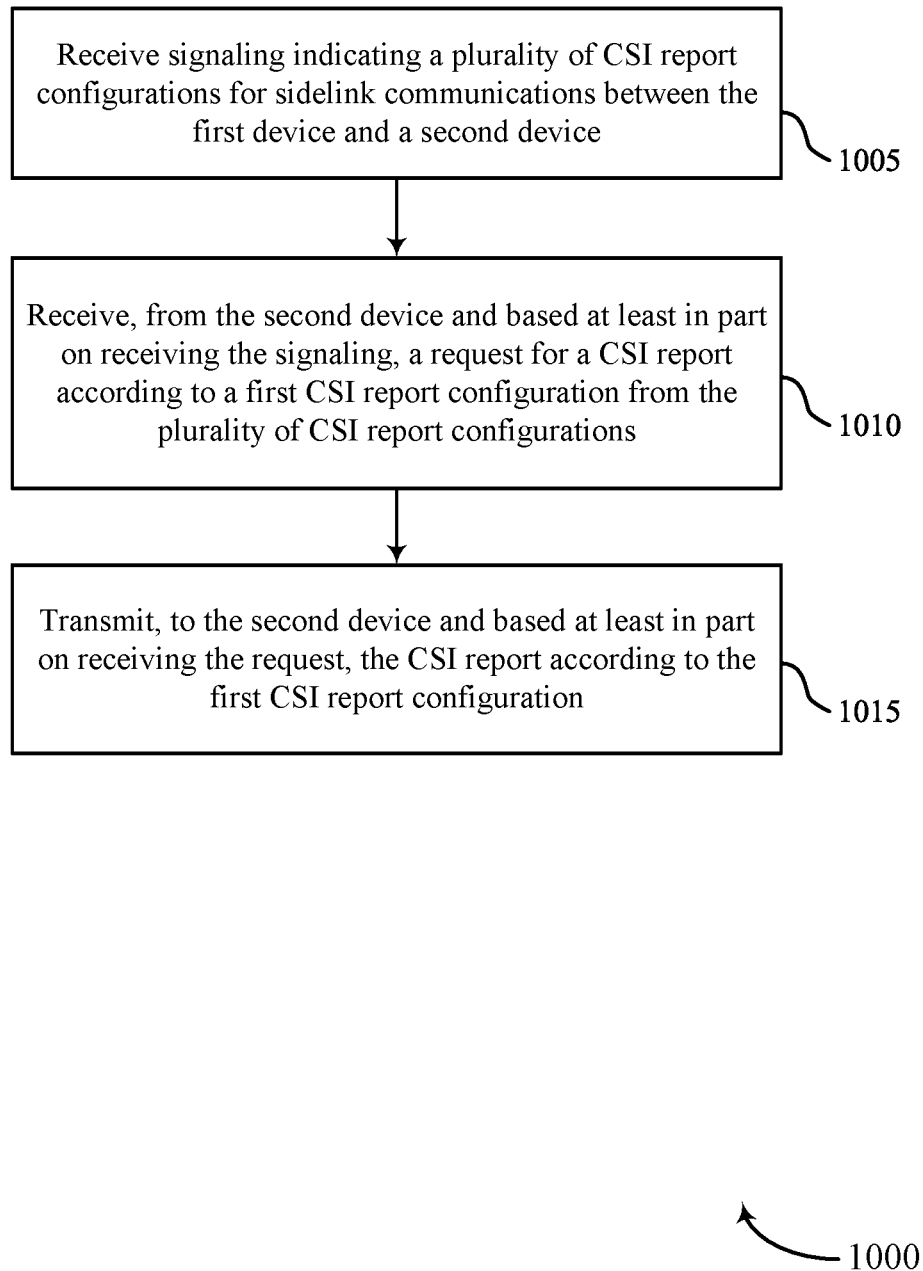
FIGS. 10 through 13 show flowcharts illustrating methods that support channel state reporting for sidelink communications in accordance with aspects of the present disclosure.

FIG. 10 shows a flowchart illustrating a method 1000 that supports channel state reporting for sidelink communications in accordance with aspects of the present disclosure. The operations of the method 1000 may be implemented by a device or its components as described herein. For example, the operations of the method 1000 may be performed by a device as described with reference to FIGS. 1 through 9. In some examples, a device may execute a set of instructions to control the functional elements of the device to perform the described functions. Additionally or alternatively, the device may perform aspects of the described functions using special-purpose hardware.

At 1005, the method may include receiving signaling indicating a set of multiple CSI report configurations for sidelink communications between the first device and a second device. The operations of 1005 may be performed in accordance with examples as disclosed herein. In some examples, aspects of the operations of 1005 may be performed by a CSI configuration receiver 825 as described with reference to FIG. 8.

At 1010, the method may include receiving, from the second device and based on receiving the signaling, a request for a CSI report according to a first CSI report configuration from the set of multiple CSI report configurations. The operations of 1010 may be performed in accordance with examples as disclosed herein. In some examples, aspects of the operations of 1010 may be performed by a CSI request receiver 830 as described with reference to FIG. 8.

At 1015, the method may include transmitting, to the second device and based on receiving the request, the CSI report according to the first CSI report configuration. The operations of 1015 may be performed in accordance with examples as disclosed herein. In some examples, aspects of the operations of 1015 may be performed by a CSI report transmitter 835 as described with reference to FIG. 8.

Figure 11:
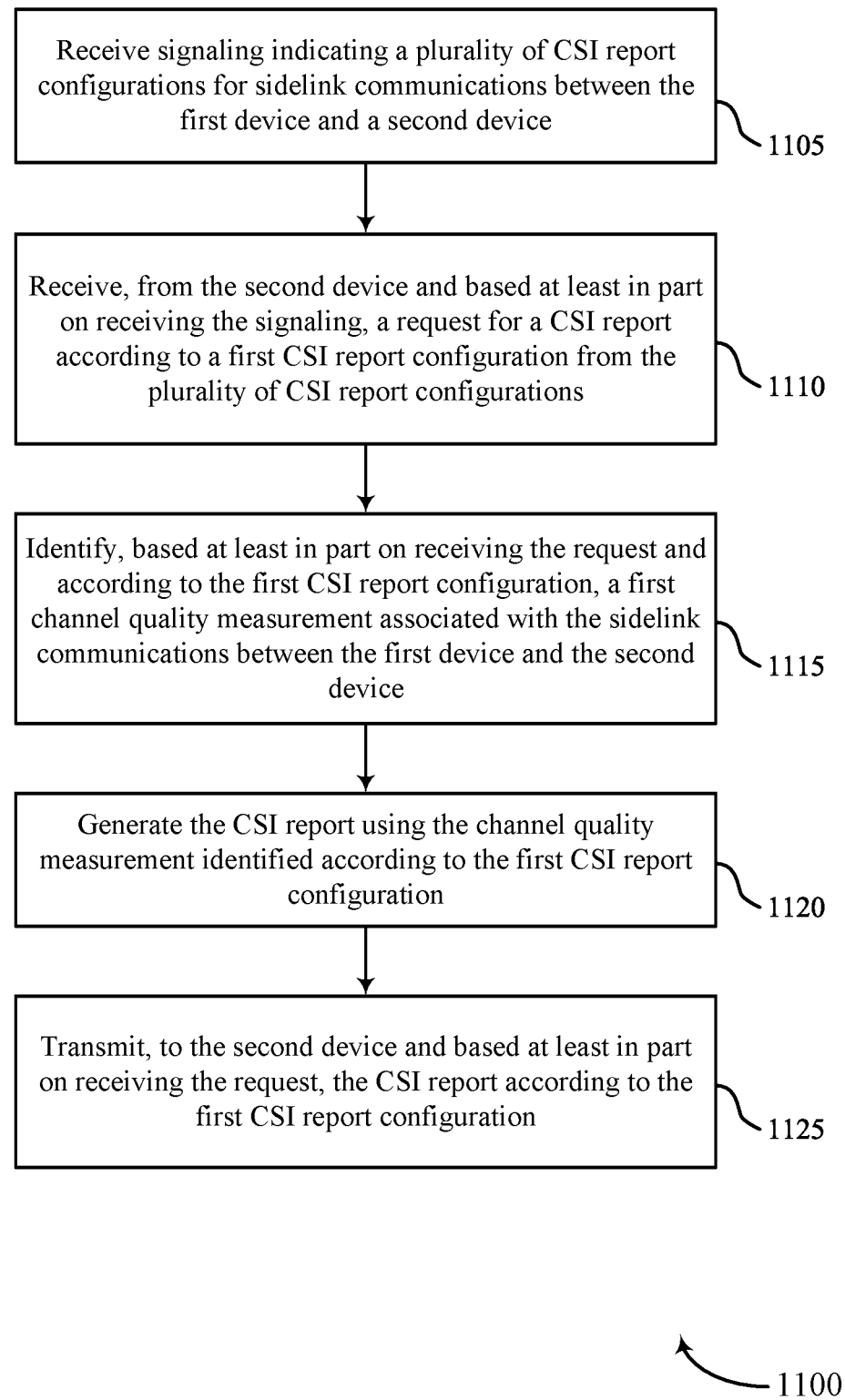

FIG. 11 shows a flowchart illustrating a method 1100 that supports channel state reporting for sidelink communications in accordance with aspects of the present disclosure. The operations of the method 1100 may be implemented by a device or its components as described herein. For example, the operations of the method 1100 may be performed by a device as described with reference to FIGS. 1 through 9. In some examples, a device may execute a set of instructions to control the functional elements of the device to perform the described functions. Additionally or alternatively, the device may perform aspects of the described functions using special-purpose hardware.

At 1105, the method may include receiving signaling indicating a set of multiple CSI report configurations for sidelink communications between the first device and a second device. The operations of 1105 may be performed in accordance with examples as disclosed herein. In some examples, aspects of the operations of 1105 may be performed by a CSI configuration receiver 825 as described with reference to FIG. 8.

At 1110, the method may include receiving, from the second device and based on receiving the signaling, a request for a CSI report according to a first CSI report configuration from the set of multiple CSI report configurations. The operations of 1110 may be performed in accordance with examples as disclosed herein. In some examples, aspects of the operations of 1110 may be performed by a CSI request receiver 830 as described with reference to FIG. 8.

At 1115, the method may include identifying, based on receiving the request and according to the first CSI report configuration, a first channel quality measurement associated with the sidelink communications between the first device and the second device. The operations of 1115 may be performed in accordance with examples as disclosed herein. In some examples, aspects of the operations of 1115 may be performed by a measurement identifying component 855 as described with reference to FIG. 8.

At 1120, the method may include generating the CSI report using the channel quality measurement identified according to the first CSI report configuration. The operations of 1120 may be performed in accordance with examples as disclosed herein. In some examples, aspects of the operations of 1120 may be performed by a CSI report generation component 860 as described with reference to FIG. 8.

At 1125, the method may include transmitting, to the second device and based on receiving the request, the CSI report according to the first CSI report configuration. The operations of 1125 may be performed in accordance with examples as disclosed herein. In some examples, aspects of the operations of 1125 may be performed by a CSI report transmitter 835 as described with reference to FIG. 8.

Figure 12:
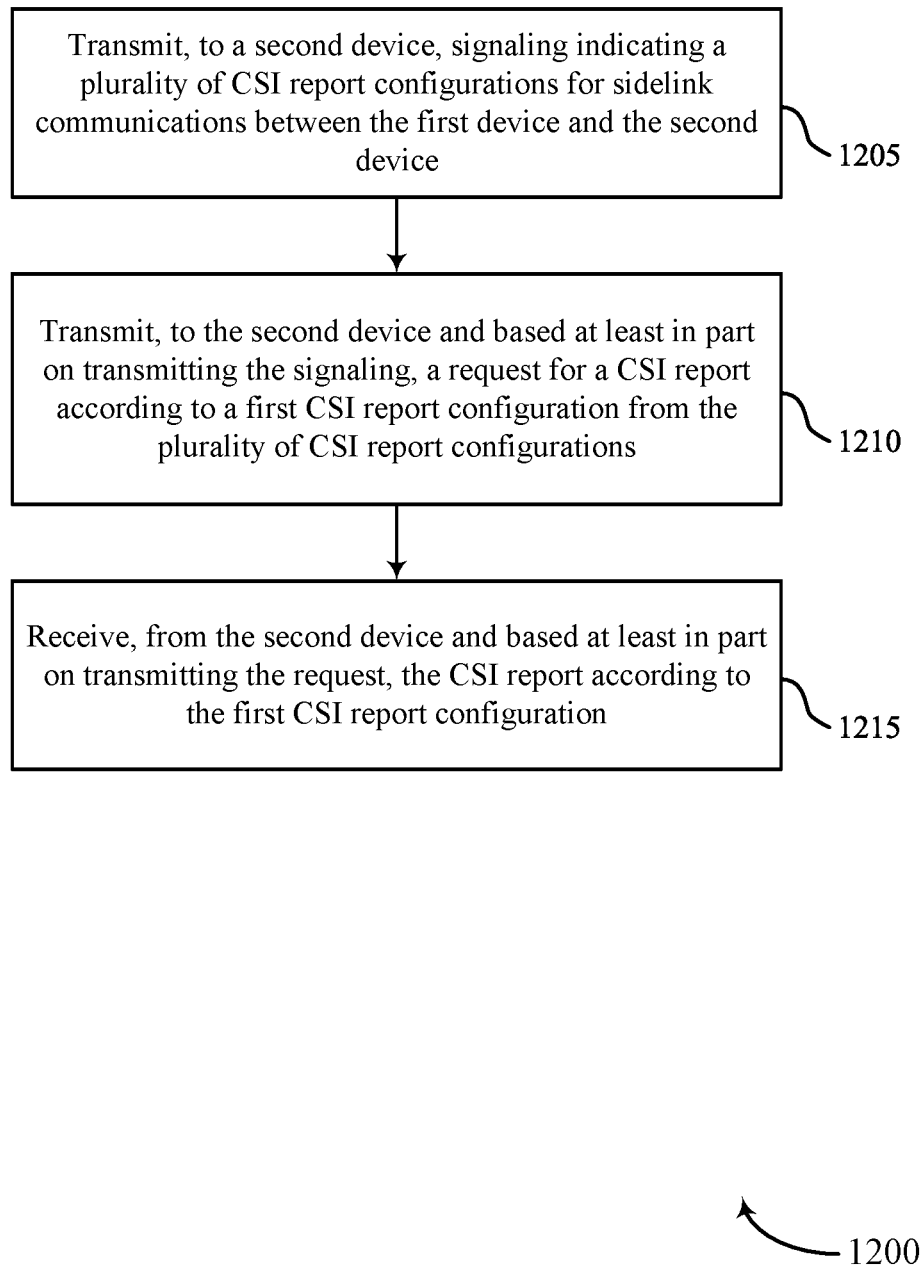

FIG. 12 shows a flowchart illustrating a method 1200 that supports channel state reporting for sidelink communications in accordance with aspects of the present disclosure. The operations of the method 1200 may be implemented by a device or its components as described herein. For example, the operations of the method 1200 may be performed by a device as described with reference to FIGS. 1 through 9. In some examples, a device may execute a set of instructions to control the functional elements of the device to perform the described functions. Additionally or alternatively, the device may perform aspects of the described functions using special-purpose hardware.

At 1205, the method may include transmitting, to a second device, signaling indicating a set of multiple CSI report configurations for sidelink communications between the first device and the second device. The operations of 1205 may be performed in accordance with examples as disclosed herein. In some examples, aspects of the operations of 1205 may be performed by a CSI configuration component 840 as described with reference to FIG. 8.

At 1210, the method may include transmitting, to the second device and based on transmitting the signaling, a request for a CSI report according to a first CSI report configuration from the set of multiple CSI report configurations. The operations of 1210 may be performed in accordance with examples as disclosed herein. In some examples, aspects of the operations of 1210 may be performed by a CSI request transmitter 845 as described with reference to FIG. 8.

At 1215, the method may include receiving, from the second device and based on transmitting the request, the CSI report according to the first CSI report configuration. The operations of 1215 may be performed in accordance with examples as disclosed herein. In some examples, aspects of the operations of 1215 may be performed by a CSI report receiver 850 as described with reference to FIG. 8.

Figure 13:
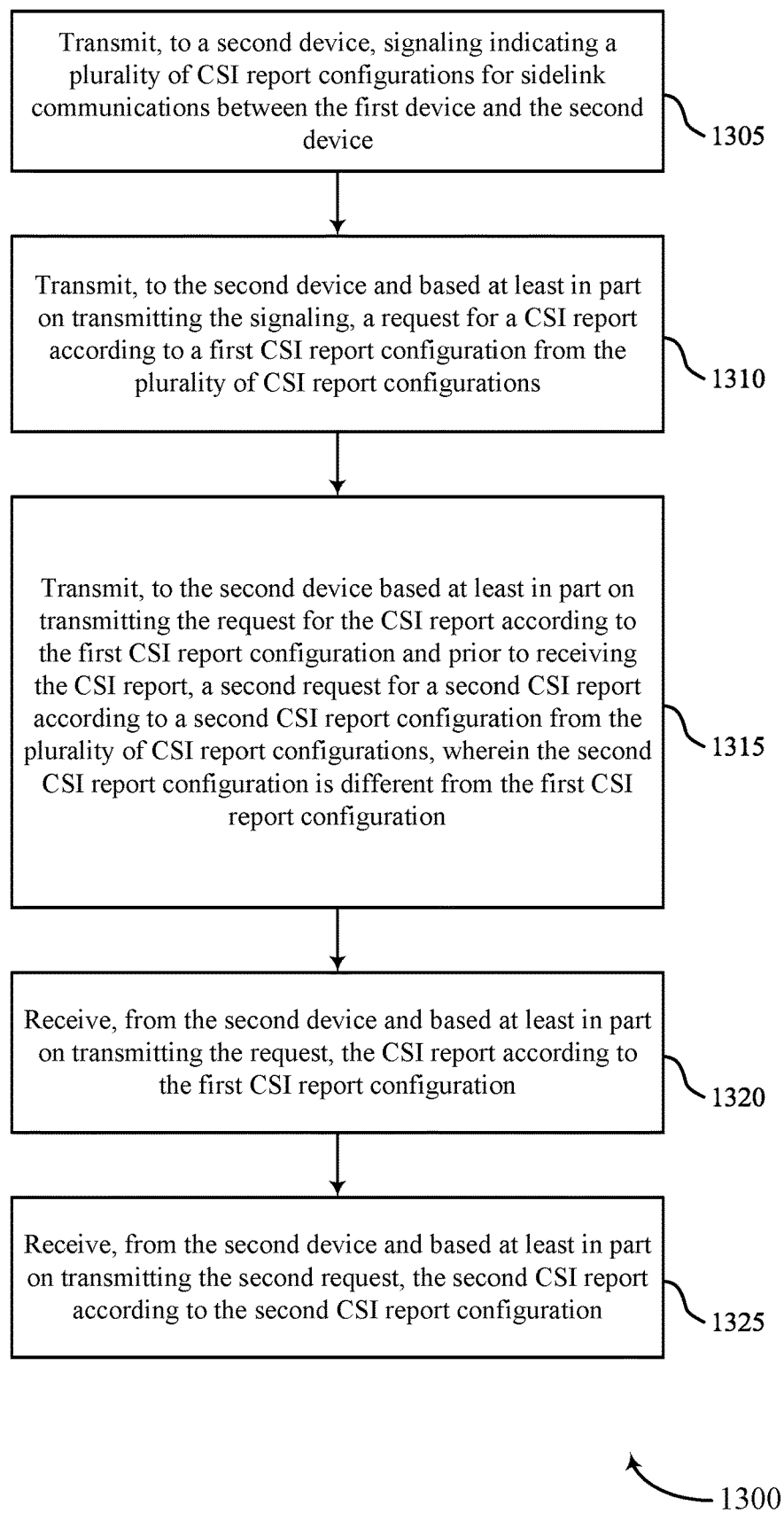

FIG. 13 shows a flowchart illustrating a method 1300 that supports channel state reporting for sidelink communications in accordance with aspects of the present disclosure. The operations of the method 1300 may be implemented by a device or its components as described herein. For example, the operations of the method 1300 may be performed by a device as described with reference to FIGS. 1 through 9. In some examples, a device may execute a set of instructions to control the functional elements of the device to perform the described functions. Additionally or alternatively, the device may perform aspects of the described functions using special-purpose hardware.

At 1305, the method may include transmitting, to a second device, signaling indicating a set of multiple CSI report configurations for sidelink communications between the first device and the second device. The operations of 1305 may be performed in accordance with examples as disclosed herein. In some examples, aspects of the operations of 1305 may be performed by a CSI configuration component 840 as described with reference to FIG. 8.

At 1310, the method may include transmitting, to the second device and based on transmitting the signaling, a request for a CSI report according to a first CSI report configuration from the set of multiple CSI report configurations. The operations of 1310 may be performed in accordance with examples as disclosed herein. In some examples, aspects of the operations of 1310 may be performed by a CSI request transmitter 845 as described with reference to FIG. 8.

At 1315, the method may include transmitting, to the second device based on transmitting the request for the CSI report according to the first CSI report configuration and prior to receiving the CSI report, a second request for a second CSI report according to a second CSI report configuration from the set of multiple CSI report configurations, where the second CSI report configuration is different from the first CSI report configuration. The operations of 1315 may be performed in accordance with examples as disclosed herein. In some examples, aspects of the operations of 1315 may be performed by a CSI request transmitter 845 as described with reference to FIG. 8.

At 1320, the method may include receiving, from the second device and based on transmitting the request, the CSI report according to the first CSI report configuration. The operations of 1320 may be performed in accordance with examples as disclosed herein. In some examples, aspects of the operations of 1320 may be performed by a CSI report receiver 850 as described with reference to FIG. 8.

At 1325, the method may include receiving, from the second device and based on transmitting the second request, the second CSI report according to the second CSI report configuration. The operations of 1325 may be performed in accordance with examples as disclosed herein. In some examples, aspects of the operations of 1325 may be performed by a CSI report receiver 850 as described with reference to FIG. 8.

The following provides an overview of aspects of the present disclosure:

Aspect 1: A method for wireless communication at a first device, comprising: receiving signaling indicating a plurality of channel state information report configurations for sidelink communications between the first device and a second device; receiving, from the second device and based at least in part on receiving the signaling, a request for a channel state information report according to a first channel state information report configuration from the plurality of channel state information report configurations; and transmitting, to the second device and based at least in part on receiving the request, the channel state information report according to the first channel state information report configuration.

Aspect 2: The method of aspect 1, wherein receiving the request for the channel state information report further comprises: receiving, from the second device, sidelink control information comprising one or more fields that indicate the first channel state information report configuration.

Aspect 3: The method of any of aspects 1 through 2, further comprising: identifying, based at least in part on receiving the request and according to the first channel state information report configuration, a first channel quality measurement associated with the sidelink communications between the first device and the second device; and generating the channel state information report using the channel quality measurement identified according to the first channel state information report configuration.

Aspect 4: The method of aspect 3, further comprising: receiving, from the second device prior to receiving the request for the channel state information report according to the first channel state information report configuration, a second request for a second channel state information report according to a second channel state information report configuration from the plurality of channel state information report configurations; identifying, based at least in part on receiving the second request and according to the second channel state information report configuration, a second channel quality measurement associated with the sidelink communications between the first device and the second device; and determining whether to generate the channel state information report using the second channel quality measurement identified according to the second channel state information report configuration based at least in part on whether the second channel state information report configuration is different from the first channel state information report configuration, wherein transmitting the channel state information report according to the first channel state information report configuration is based at least in part on the determining.

Aspect 5: The method of aspect 4, further comprising: generating the channel state information report using the first channel quality measurement identified according to the first channel state information report configuration and the second channel quality measurement identified according to the second channel state information report configuration based at least in part on the second channel state information report configuration being the same as the first channel state information report configuration.

Aspect 6: The method of any of aspects 1 through 3, further comprising: receiving, from the second device based at least in part on receiving the request for the channel state information report according to the first channel state information report configuration and prior to transmitting the channel state information report, a second request for a second channel state information report according to a second channel state information report configuration from the plurality of channel state information report configurations, wherein the second channel state information report configuration is different from the first channel state information report configuration; and transmitting, to the second device and based at least in part on receiving the second request, the second channel state information report according to the second channel state information report configuration.

Aspect 7: The method of aspect 6, wherein transmitting the channel state information report and transmitting the second channel state information report further comprises: transmitting a physical sidelink shared channel transmission comprising a first media access control-control element and a second media access control-control element, wherein the first media access control-control element includes the channel state information report and a first indication of the first channel state information report configuration, and wherein the second media access control-control element includes the second channel state information report and a second indication of the second channel state information report configuration.

Aspect 8: The method of aspect 7, wherein the first channel state information report configuration is associated with a first component carrier and the second channel state information report configuration is associated with a second component carrier, and the first media access control-control element includes an indication of a first cell index associated with the channel state information report and the second media access control-control element includes an indication of a second cell index associated with the second channel state information report.

Aspect 9: The method aspect 6, wherein transmitting the channel state information report and transmitting the second channel state information report further comprises: transmitting a physical sidelink shared channel transmission comprising a media access control-control element, wherein the media access control-control element includes the channel state information report and the second channel state information report.

Aspect 10: The method of any of aspects 1 through 9, wherein transmitting the channel state information report further comprises: transmitting the channel state information report comprising an indication of the first channel state information report configuration.

Aspect 11: The method of any of aspects 1 through 10, wherein the signaling indicating the plurality of channel state information report configurations indicates a respective transmission configuration indicator state, from a plurality of transmission configuration indicator states associated with the first device for the sidelink communications between the first device and the second device, corresponding to each of the plurality of channel state information report configurations; the request for the channel state information report comprises an indication of a first transmission configuration indicator state from the plurality of transmission configuration indicator states corresponding to the first channel state information report configuration; and transmitting the channel state information report according to the first channel state information report configuration is based at least in part on the request for the channel state information report comprising the indication of the first transmission configuration indicator state.

Aspect 12: The method of any of aspects 1 through 11, further comprising: receiving, from the second device, a channel state information reference signal based at least in part on the request for the channel state information report and the first channel state information report configuration, wherein transmitting the channel state information report is based at least in part on receiving the channel state information reference signal.

Aspect 13: A method for wireless communication at a first device, comprising: transmitting, to a second device, signaling indicating a plurality of channel state information report configurations for sidelink communications between the first device and the second device; transmitting, to the second device and based at least in part on transmitting the signaling, a request for a channel state information report according to a first channel state information report configuration from the plurality of channel state information report configurations; and receiving, from the second device and based at least in part on transmitting the request, the channel state information report according to the first channel state information report configuration.

Aspect 14: The method of aspect 13, wherein transmitting the request for the channel state information report further comprises: transmitting, to the second device, sidelink control information comprising one or more bits that indicate the first channel state information report configuration.

Aspect 15: The method of any of aspects 13 through 14, further comprising: transmitting, to the second device based at least in part on transmitting the request for the channel state information report according to the first channel state information report configuration and prior to receiving the channel state information report, a second request for a second channel state information report according to a second channel state information report configuration from the plurality of channel state information report configurations, wherein the second channel state information report configuration is different from the first channel state information report configuration; and receiving, from the second device and based at least in part on transmitting the second request, the second channel state information report according to the second channel state information report configuration.

Aspect 16: The method of aspect 15, wherein receiving the channel state information report and receiving the second channel state information report further comprises: receiving a physical sidelink shared channel transmission comprising a first media access control-control element and a second media access control-control element, wherein the first media access control-control element includes the channel state information report and a first indication of the first channel state information report configuration, and wherein the second media access control-control element includes the second channel state information report and a second indication of the second channel state information report configuration.

Aspect 17: The method of any of aspects 13 through 16, wherein receiving the channel state information report further comprises: receiving the channel state information report comprising an indication of the first channel state information report configuration.

Aspect 18: The method of any of aspects 13 through 17, wherein the signaling indicating the plurality of channel state information report configurations indicates a respective transmission configuration indicator state, from a plurality of transmission configuration indicator states associated with the first device for the sidelink communications between the first device and the second device, corresponding to each of the plurality of channel state information report configurations; the request for the channel state information report comprises an indication of a first transmission configuration indicator state from the plurality of transmission configuration indicator states corresponding to the first channel state information report configuration; and receiving the channel state information report according to the first channel state information report configuration is based at least in part on the request for the channel state information report comprising the indication of the first transmission configuration indicator state.

Aspect 19: The method of any of aspects 13 through 18, further comprising: identifying that a scheduled transmission associated with a first transmission power and the request for the channel state information report at least partially overlap in time; identifying a scaled transmission power for transmitting the request for the channel state information report to the second device based at least in part on the scheduled transmission and the request for the channel state information report at least partially overlapping in time; and determining whether to transmit the request for the channel state information report based at least in part on whether a sum of the first transmission power and the scaled transmission power exceeds a threshold transmit power, wherein transmitting the request for the channel state information report is based at least in part on the sum being less than the threshold transmit power.

Aspect 20: The method of any of aspects 13 through 19, further comprising: selecting, from the plurality of channel state information report configurations, the first channel state information report configuration for the channel state information report based at least in part on a transmission power level of a channel state information reference signal, wherein transmitting the request for the channel state information report is based at least in part on the selecting; and transmitting, to the second device, the channel state information reference signal according to the transmission power level, wherein receiving the channel state information report is based at least in part on transmitting the channel state information reference signal.

Aspect 21: An apparatus for wireless communication at a first device, comprising a processor; memory coupled with the processor; and instructions stored in the memory and executable by the processor to cause the apparatus to perform a method of any of aspects 1 through 12.

Aspect 22: An apparatus for wireless communication at a first device, comprising at least one means for performing a method of any of aspects 1 through 12.

Aspect 23: A non-transitory computer-readable medium storing code for wireless communication at a first device, the code comprising instructions executable by a processor to perform a method of any of aspects 1 through 12.

Aspect 24: An apparatus for wireless communication at a first device, comprising a processor; memory coupled with the processor; and instructions stored in the memory and executable by the processor to cause the apparatus to perform a method of any of aspects 13 through 20.

Aspect 25: An apparatus for wireless communication at a first device, comprising at least one means for performing a method of any of aspects 13 through 20.

Aspect 26: A non-transitory computer-readable medium storing code for wireless communication at a first device, the code comprising instructions executable by a processor to perform a method of any of aspects 13 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first device, comprising:
   receiving signaling indicating a plurality of channel state information report configurations for sidelink communications between the first device and a second device;
   receiving, from the second device and based at least in part on receiving the signaling, a request for a channel state information report according to a first channel state information report configuration from the plurality of channel state information report configurations;
   transmitting, to the second device and based at least in part on receiving the request, the channel state information report according to the first channel state information report configuration;
   receiving, from the second device based at least in part on receiving the request for the channel state information report according to the first channel state information report configuration and prior to transmitting the channel state information report, a second request for a second channel state information report according to a second channel state information report configuration from the plurality of channel state information report configurations, wherein the second channel state information report configuration is different from the first channel state information report configuration; and
   transmitting, to the second device and based at least in part on receiving the second request, the second channel state information report according to the second channel state information report configuration.

2. The method of claim 1, wherein receiving the request for the channel state information report further comprises:
   receiving, from the second device, sidelink control information comprising one or more fields that indicate the first channel state information report configuration.

3. The method of claim 1, further comprising:
   identifying, based at least in part on receiving the request and according to the first channel state information report configuration, a first channel quality measurement associated with the sidelink communications between the first device and the second device; and
   generating the channel state information report using the channel quality measurement identified according to the first channel state information report configuration.

4. The method of claim 3, further comprising:
   receiving, from the second device prior to receiving the request for the channel state information report according to the first channel state information report configuration, a second request for a second channel state information report according to a second channel state information report configuration from the plurality of channel state information report configurations;
   identifying, based at least in part on receiving the second request and according to the second channel state information report configuration, a second channel quality measurement associated with the sidelink communications between the first device and the second device; and
   determining whether to generate the channel state information report using the second channel quality measurement identified according to the second channel state information report configuration based at least in part on whether the second channel state information report configuration is different from the first channel state information report configuration, wherein transmitting the channel state information report according to the first channel state information report configuration is based at least in part on the determining.

5. The method of claim 4, further comprising:
   generating the channel state information report using the first channel quality measurement identified according to the first channel state information report configuration and the second channel quality measurement identified according to the second channel state information report configuration based at least in part on the second channel state information report configuration being the same as the first channel state information report configuration.

6. The method of claim 1, wherein transmitting the channel state information report and transmitting the second channel state information report further comprises:
   transmitting a physical sidelink shared channel transmission comprising a first media access control-control element and a second media access control-control element, wherein the first media access control-control element includes the channel state information report and a first indication of the first channel state information report configuration, and wherein the second media access control-control element includes the second channel state information report and a second indication of the second channel state information report configuration.

7. The method of claim 6, wherein the first channel state information report configuration is associated with a first component carrier and the second channel state information report configuration is associated with a second component carrier, and wherein the first media access control-control element includes an indication of a first cell index associated with the channel state information report and the second media access control-control element includes an indication of a second cell index associated with the second channel state information report.

8. The method of claim 1, wherein transmitting the channel state information report and transmitting the second channel state information report further comprises:
   transmitting a physical sidelink shared channel transmission comprising a media access control-control element, wherein the media access control-control element includes the channel state information report and the second channel state information report.

9. The method of claim 1, wherein transmitting the channel state information report further comprises:
   transmitting the channel state information report comprising an indication of the first channel state information report configuration.

10. The method of claim 1, wherein:
   the signaling indicating the plurality of channel state information report configurations indicates a respective transmission configuration indicator state, from a plurality of transmission configuration indicator states associated with the first device for the sidelink communications between the first device and the second device, corresponding to each of the plurality of channel state information report configurations;
   the request for the channel state information report comprises an indication of a first transmission configuration indicator state from the plurality of transmission configuration indicator states corresponding to the first channel state information report configuration; and
   transmitting the channel state information report according to the first channel state information report configuration is based at least in part on the request for the channel state information report comprising the indication of the first transmission configuration indicator state.

11. The method of claim 1, further comprising:
   receiving, from the second device, a channel state information reference signal based at least in part on the request for the channel state information report and the first channel state information report configuration, wherein transmitting the channel state information report is based at least in part on receiving the channel state information reference signal.

12. A method for wireless communication at a first device, comprising:
   transmitting, to a second device, signaling indicating a plurality of channel state information report configurations for sidelink communications between the first device and the second device;
   transmitting, to the second device and based at least in part on transmitting the signaling, a request for a channel state information report according to a first channel state information report configuration from the plurality of channel state information report configurations;
   receiving, from the second device and based at least in part on transmitting the request, the channel state information report according to the first channel state information report configuration;
   transmitting, to the second device based at least in part on transmitting the request for the channel state information report according to the first channel state information report configuration and prior to receiving the channel state information report, a second request for a second channel state information report according to a second channel state information report configuration from the plurality of channel state information report configurations, wherein the second channel state information report configuration is different from the first channel state information report configuration; and
   receiving, from the second device and based at least in part on transmitting the second request, the second channel state information report according to the second channel state information report configuration.

13. The method of claim 12, wherein transmitting the request for the channel state information report further comprises:
   transmitting, to the second device, sidelink control information comprising one or more bits that indicate the first channel state information report configuration.

14. The method of claim 12, wherein receiving the channel state information report and receiving the second channel state information report further comprises:
   receiving a physical sidelink shared channel transmission comprising a first media access control-control element and a second media access control-control element, wherein the first media access control-control element includes the channel state information report and a first indication of the first channel state information report configuration, and wherein the second media access control-control element includes the second channel state information report and a second indication of the second channel state information report configuration.

15. The method of claim 12, wherein receiving the channel state information report further comprises:
   receiving the channel state information report comprising an indication of the first channel state information report configuration.

16. The method of claim 12, wherein:
   the signaling indicating the plurality of channel state information report configurations indicates a respective transmission configuration indicator state, from a plurality of transmission configuration indicator states associated with the first device for the sidelink communications between the first device and the second device, corresponding to each of the plurality of channel state information report configurations;
   the request for the channel state information report comprises an indication of a first transmission configuration indicator state from the plurality of transmission configuration indicator states corresponding to the first channel state information report configuration; and
   receiving the channel state information report according to the first channel state information report configuration is based at least in part on the request for the channel state information report comprising the indication of the first transmission configuration indicator state.

17. The method of claim 12, further comprising:
identifying that a scheduled transmission associated with a first transmission power and the request for the channel state information report at least partially overlap in time;
identifying a scaled transmission power for transmitting the request for the channel state information report to the second device based at least in part on the scheduled transmission and the request for the channel state information report at least partially overlapping in time; and
determining whether to transmit the request for the channel state information report based at least in part on whether a sum of the first transmission power and the scaled transmission power exceeds a threshold transmit power, wherein transmitting the request for the channel state information report is based at least in part on the sum being less than the threshold transmit power.

18. The method of claim 12, further comprising:
selecting, from the plurality of channel state information report configurations, the first channel state information report configuration for the channel state information report based at least in part on a transmission power level of a channel state information reference signal, wherein transmitting the request for the channel state information report is based at least in part on the selecting; and
transmitting, to the second device, the channel state information reference signal according to the transmission power level, wherein receiving the channel state information report is based at least in part on transmitting the channel state information reference signal.

19. An apparatus for wireless communication at a first device, comprising:
a processor;
memory coupled with the processor; and
instructions stored in the memory and executable by the processor to cause the apparatus to:
receive signaling indicating a plurality of channel state information report configurations for sidelink communications between the first device and a second device;
receive, from the second device and based at least in part on receiving the signaling, a request for a channel state information report according to a first channel state information report configuration from the plurality of channel state information report configurations;
transmit, to the second device and based at least in part on receiving the request, the channel state information report according to the first channel state information report configuration;
receive, from the second device based at least in part on receiving the request for the channel state information report according to the first channel state information report configuration and prior to transmitting the channel state information report, a second request for a second channel state information report according to a second channel state information report configuration from the plurality of channel state information report configurations, wherein the second channel state information report configuration is different from the first channel state information report configuration; and
transmit, to the second device and based at least in part on receiving the second request, the second channel state information report according to the second channel state information report configuration.

20. The apparatus of claim 19, wherein the instructions to receive the request for the channel state information report are further executable by the processor to cause the apparatus to:
receive, from the second device, sidelink control information comprising one or more fields that indicate the first channel state information report configuration.

21. The apparatus of claim 19, wherein the instructions are further executable by the processor to cause the apparatus to:
identify, based at least in part on receiving the request and according to the first channel state information report configuration, a first channel quality measurement associated with the sidelink communications between the first device and the second device; and
generate the channel state information report using the channel quality measurement identified according to the first channel state information report configuration.

22. The apparatus of claim 21, wherein the instructions are further executable by the processor to cause the apparatus to:
receive, from the second device prior to receiving the request for the channel state information report according to the first channel state information report configuration, a second request for a second channel state information report according to a second channel state information report configuration from the plurality of channel state information report configurations;
identify, based at least in part on receiving the second request and according to the second channel state information report configuration, a second channel quality measurement associated with the sidelink communications between the first device and the second device; and
determine whether to generate the channel state information report using the second channel quality measurement identified according to the second channel state information report configuration based at least in part on whether the second channel state information report configuration is different from the first channel state information report configuration, wherein transmitting the channel state information report according to the first channel state information report configuration is based at least in part on the determining.

23. The apparatus of claim 22, wherein the instructions are further executable by the processor to cause the apparatus to:
generate the channel state information report using the first channel quality measurement identified according to the first channel state information report configuration and the second channel quality measurement identified according to the second channel state information report configuration based at least in part on the second channel state information report configuration being the same as the first channel state information report configuration.

24. An apparatus for wireless communication at a first device, comprising:
a processor;
memory coupled with the processor; and
instructions stored in the memory and executable by the processor to cause the apparatus to:
transmit, to a second device, signaling indicating a plurality of channel state information report configurations for sidelink communications between the first device and the second device;

transmit, to the second device and based at least in part on transmitting the signaling, a request for a channel state information report according to a first channel state information report configuration from the plurality of channel state information report configurations;

receive, from the second device and based at least in part on transmitting the request, the channel state information report according to the first channel state information report configuration;

transmit, to the second device based at least in part on transmitting the request for the channel state information report according to the first channel state information report configuration and prior to receiving the channel state information report, a second request for a second channel state information report according to a second channel state information report configuration from the plurality of channel state information report configurations, wherein the second channel state information report configuration is different from the first channel state information report configuration; and receive, from the second device and based at least in part on transmitting the second request, the second channel state information report according to the second channel state information report configuration.

25. The apparatus of claim 24, wherein the instructions to transmit the request for the channel state information report are further executable by the processor to cause the apparatus to:

transmit, to the second device, sidelink control information comprising one or more bits that indicate the first channel state information report configuration.

26. The apparatus of claim 24, wherein the instructions to receive the channel state information report and receiving the second channel state information report are further executable by the processor to cause the apparatus to:

receive a physical sidelink shared channel transmission comprising a first media access control-control element and a second media access control-control element, wherein the first media access control-control element includes the channel state information report and a first indication of the first channel state information report configuration, and wherein the second media access control-control element includes the second channel state information report and a second indication of the second channel state information report configuration.

* * * * *